US011187943B2

(12) United States Patent
You et al.

(10) Patent No.: US 11,187,943 B2
(45) Date of Patent: Nov. 30, 2021

(54) FRINGE FIELD DRIVEN LIQUID CRYSTAL DISPLAY PANEL AND METHOD OF DETERMINING A DIRECTION OF AN OPTICAL AXIS OF A GLASS LAYER IN A FRINGE FIELD DRIVEN LIQUID CRYSTAL DISPLAY PANE

(71) Applicant: BOE TECHNOLOGY GROUP CO., LTD., Beijing (CN)

(72) Inventors: Jaegeon You, Beijing (CN); Xinxing Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 816 days.

(21) Appl. No.: 15/777,589

(22) PCT Filed: Jun. 15, 2017

(86) PCT No.: PCT/CN2017/088370
§ 371 (c)(1),
(2) Date: May 18, 2018

(87) PCT Pub. No.: WO2018/227447
PCT Pub. Date: Dec. 20, 2018

(65) Prior Publication Data
US 2021/0173263 A1   Jun. 10, 2021

(51) Int. Cl.
*G02F 1/1337* (2006.01)
*G02F 1/13363* (2006.01)
(Continued)

(52) U.S. Cl.
CPC ...... *G02F 1/133784* (2013.01); *G02F 1/1339* (2013.01); *G02F 1/133528* (2013.01); *G02F 1/133635* (2021.01); *G02F 1/133757* (2021.01)

(58) Field of Classification Search
CPC ......... G02F 1/133784; G02F 1/133757; G02F 1/133635; G02F 1/133528; G02F 1/1339; G02F 1/134372
See application file for complete search history.

(56) References Cited

U.S. PATENT DOCUMENTS

2002/0041354 A1* 4/2002 Noh ................. G02F 1/134363
349/141
2003/0197821 A1   10/2003 Mi
(Continued)

FOREIGN PATENT DOCUMENTS

CN   2696004 Y    4/2005
CN   1658038 A    8/2005
(Continued)

OTHER PUBLICATIONS

International Search Report & Written Opinion dated Mar. 6, 2018, regarding PCT/CN2017/088370.
(Continued)

*Primary Examiner* — Hoan C Nguyen
(74) *Attorney, Agent, or Firm* — Intellectual Valley Law, P.C.

(57) ABSTRACT

The present application discloses a fringe field driven liquid crystal display panel. The fringe field driven liquid crystal display panel includes a first substrate having a first glass layer and a first alignment film on the first glass layer; a second substrate facing the first substrate and having a second glass layer and a second alignment film on the second glass layer; and a liquid crystal layer between the first alignment film and the second alignment film. A first main optical axis of the first glass layer and a second main optical axis of the second glass layer are non-parallel to each other and have an included angle α. The first alignment film and the second alignment film have non-parallel rubbing
(Continued)

angles, configured to reduce light leakage and color shift in the fringe field driven liquid crystal display panel.

15 Claims, 11 Drawing Sheets

(51) Int. Cl.
 *G02F 1/1335* (2006.01)
 *G02F 1/1339* (2006.01)

(56) References Cited

U.S. PATENT DOCUMENTS

| | | | |
|---|---|---|---|
| 2005/0179835 A1 | 8/2005 | Lee et al. | |
| 2006/0132677 A1* | 6/2006 | Asao | G02F 1/133514 349/106 |
| 2012/0320327 A1* | 12/2012 | Park | B32B 37/1292 349/153 |
| 2014/0327861 A1 | 11/2014 | Huang et al. | |
| 2015/0079398 A1* | 3/2015 | Amin | B32B 17/06 428/408 |
| 2016/0062166 A1* | 3/2016 | Kim | G02F 1/13363 349/96 |
| 2016/0357038 A1* | 12/2016 | Zhao | G02F 1/133528 |
| 2018/0088438 A1* | 3/2018 | Wang | G02F 1/292 |

FOREIGN PATENT DOCUMENTS

| | | |
|---|---|---|
| CN | 103926740 A | 7/2014 |
| CN | 105164578 A | 12/2015 |
| CN | 106324910 A | 1/2017 |

OTHER PUBLICATIONS

Improvement of Dark State Light Leakage in ADS Model LCDs, Jaegeon You et al., SID 2015 Digest, p. 1544-1547 (2015).
Light Leakage Study of the Curved ADS Model LCDs, Jaegeon You et al., SID 2015 Digest, p. 637-640 (2015).

* cited by examiner

45°

−45°

FRINGE FIELD DRIVEN LIQUID CRYSTAL DISPLAY PANEL AND METHOD OF DETERMINING A DIRECTION OF AN OPTICAL AXIS OF A GLASS LAYER IN A FRINGE FIELD DRIVEN LIQUID CRYSTAL DISPLAY PANE

CROSS-REFERENCE TO RELATED APPLICATION

This application is a national stage application under 35 U.S.C. § 371 of International Application No. PCT/CN2017/088370, filed Jun. 15, 2017, the contents of which are incorporated by reference in the entirety.

TECHNICAL FIELD

The present invention relates to display technology, more particularly, to a fringe field driven liquid crystal display panel and a method of determining a direction of an optical axis of a glass layer in a fringe field driven liquid crystal display panel.

BACKGROUND

In a fringe field driven liquid crystal display panel, the liquid crystal layer is driven by a fringe electric field. Examples of fringe field driven liquid crystal display panel include an advanced super-dimensional switching (ADS) liquid crystal display panel, an in-plane switching (IPS) liquid crystal display panel, and a fringe field switching (FFS) liquid crystal display panel. In a fringe field driven liquid crystal display panel, liquid crystal molecules have a substantially parallel and uniform orientation relative to a substrate in a non-driven state. In the non-driven state, an oscillation direction of light substantially does not change as the light passes through the liquid crystal layer. When the polarization directions of two polarizers disposed on outer surfaces of two substrates are substantially perpendicular to each other, the fringe field driven liquid crystal display panel is in a normally dark state.

SUMMARY

In one aspect, the present invention provides a fringe field driven liquid crystal display panel comprising a first substrate comprising a first glass layer and a first alignment film on the first glass layer; a second substrate facing the first substrate and comprising a second glass layer and a second alignment film on the second glass layer; and a liquid crystal layer between the first alignment film and the second alignment film; wherein a first main optical axis of the first glass layer and a second main optical axis of the second glass layer are non-parallel to each other and have an included angle $\alpha$; and the first alignment film and the second alignment film have non-parallel rubbing angles, configured to reduce light leakage and color shift in the fringe field driven liquid crystal display panel.

Optionally, a difference $\Delta\theta$ between a first rubbing angle of the first alignment film and a second rubbing angle of the second alignment film is substantially equal to $$\left(\sin\frac{\alpha}{2}\right)^2 * \left(\frac{ret}{\lambda}\right) * 360;$$

wherein ret is an optical retardation value of the first glass layer and the second glass layer; ret is substantially equal to $(SOC1*\Delta\sigma1*t1)+(SOC2*\Delta\sigma2*t2)$; SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer; and $\lambda$ is a wavelength of incident light.

Optionally, $\alpha$ is substantially 90 degrees; and $\Delta\theta$ is substantially equal to $$\frac{(SOC1*\Delta\sigma1*t1)+(SOC2*\Delta\sigma2*t2)}{\lambda}*180.$$

Optionally, the fringe field driven liquid crystal display panel further comprises a first polarizer on a side of the first substrate distal to the second substrate, the first polarizer having a first polarization direction; and a second polarizer on a side of the second substrate distal to the first substrate, the second polarizer having a second polarization direction; wherein the first main optical axis is at an acute angle in clock-wise direction with respect to the first polarization direction; the second main optical axis is at an acute angle in counter-clock-wise direction with respect to the first polarization direction; the first rubbing angle is at an acute angle in counter-clock-wise direction with respect to the first polarization direction; and the second rubbing angle is at an acute angle in clock-wise direction with respect to the first polarization direction.

Optionally, the first main optical axis is at 45 degrees in clock-wise direction with respect to the first polarization direction; the second main optical axis is at substantially 45 degrees in counter-clock-wise direction with respect to the first polarization direction; the first rubbing angle is at an acute angle of $$\frac{(SOC1*\Delta\sigma1*t1)}{\lambda}*180$$

in counter-clock-wise direction with respect to the first polarization direction; and the second rubbing angle is at an acute angle of $$\frac{(SOC2*\Delta\sigma2*t2)}{\lambda}*180$$

in clock-wise direction with respect to the first polarization direction.

Optionally, the fringe field driven liquid crystal display panel further comprises a first polarizer on a side of the first substrate distal to the second substrate, the first polarizer having a first polarization direction; and a second polarizer on a side of the second substrate distal to the first substrate, the second polarizer having a second polarization direction; wherein the first main optical axis is at an acute angle in counter-clock-wise direction with respect to the first polarization direction; the second main optical axis is at an acute angle in clock-wise direction with respect to the first polarization direction; the first rubbing angle is at an acute angle in clock-wise direction with respect to the first polarization direction; and the second rubbing angle is at an acute angle in counter-clock-wise direction with respect to the first polarization direction.

Optionally, the first main optical axis is at 45 degrees in counter-clock-wise direction with respect to the first polarization direction the second main optical axis is at substantially 45 degrees in clock-wise direction with respect to the first polarization direction; the first rubbing angle is at an acute angle of $$\frac{(SOC1*\Delta\sigma1*t1)}{\lambda}*180$$

in clock-wise direction with respect to the first polarization direction; and the second rubbing angle is at an acute angle of $$\frac{(SOC2*\Delta\sigma2*t2)}{\lambda}*180$$

in counter-clock-wise direction with respect to the first polarization direction.

Optionally, the second main optical axis is at an acute angle or a right angle in counter-clock-wise direction with respect to the first main optical axis; and the second rubbing angle is at an acute angle in clock-wise direction with respect to the first rubbing angle.

Optionally, the second main optical axis is at an acute angle or a right angle in clock-wise direction with respect to the first main optical axis; and the second rubbing angle is at an acute angle in counter-clock-wise direction with respect to the first rubbing angle.

Optionally, the fringe field driven liquid crystal display panel further comprises a first polarizer on a side of the first substrate distal to the second substrate, the first polarizer having a first polarization direction; a second polarizer on a side of the second substrate distal to the first substrate, the second polarizer having a second polarization direction; and at least one compensation plate configured to reduce light leakage and color shift in the fringe field driven liquid crystal display panel.

Optionally, the fringe field driven liquid crystal display panel further comprises a sealant layer between the first substrate and the second substrate sealing the first substrate and the second substrate together to form a cell; wherein the sealant layer has a width at a first corner and a second corner greater than that at a third corner and a fourth corner, configured to reduce light leakage and color shift in the fringe field driven liquid crystal display panel; the first corn and the second corner are diagonally opposite to each other; the third corner and the fourth corner are diagonally opposite to each other; and an included angle between a direction from the first corner to the second corner and the first main optical axis is greater than an included angle between the direction from the first corner to the second corner and the second main optical axis.

In another aspect, the present invention provides a fringe field driven liquid crystal display panel comprising a first substrate comprising a first glass layer; a second substrate facing the first substrate and comprising a second glass layer; a liquid crystal layer between the first substrate and the second substrate; a first polarizer on a side of the first substrate distal to the second substrate, the first polarizer having a first polarization direction; a second polarizer on a side of the second substrate distal to the first substrate, the second polarizer having a second polarization direction; and at least one compensation plate; wherein a first main optical axis of the first glass layer and a second main optical axis of the second glass layer are non-parallel to each other and have an included angle α; and the at least one compensation plate is configured to reduce light leakage and color shift in the fringe field driven liquid crystal display panel.

Optionally, the fringe field driven liquid crystal display panel comprises a first compensation plate on a side of the first substrate distal to the second substrate; the first compensation plate has a first retardation along a direction substantially orthogonal to the first main optical axis of the first glass layer; and the first retardation has an absolute value substantially the same as a retardation value of the first glass layer.

Optionally, the fringe field driven liquid crystal display panel comprises a second compensation plate on a side of the second substrate distal to the first substrate; the second compensation plate has a second retardation along a direction substantially orthogonal to the second main optical axis of the second glass layer; and the second retardation has an absolute value substantially the same as a retardation value of the second glass layer.

Optionally, the fringe field driven liquid crystal display panel comprises a first compensation plate on a side of the first substrate distal to the second substrate and a second compensation plate on a side of the second substrate distal to the first substrate; the first compensation plate has a first retardation along a direction substantially orthogonal to the first main optical axis of the first glass layer, the first retardation has an absolute value substantially the same as a retardation value of the first glass layer; the second compensation plate has a second retardation along a direction substantially orthogonal to the second main optical axis of the second glass layer; and the second retardation has an absolute value substantially the same as a retardation value of the second glass layer.

Optionally, the at least one compensation plate is integral with at least one of the first polarizer and the second polarizer.

Optionally, a first compensation plate is integral with the first polarizer; the first polarizer has a first retardation along a direction substantially orthogonal to the first main optical axis of the first glass layer; and the first retardation has an absolute value substantially the same as a retardation value of the first glass layer.

Optionally, a second compensation plate is integral with the second polarizer; the second polarizer has a second retardation along a direction substantially orthogonal to the second main optical axis of the second glass layer; and the second retardation has an absolute value substantially the same as a retardation value of the second glass layer.

Optionally, the fringe field driven liquid crystal display panel is an Advanced Super Dimension Switch mode liquid crystal display panel.

In another aspect, the present invention provides a fringe field driven liquid crystal display panel comprising a first substrate comprising a first glass layer; a second substrate facing the first substrate and comprising a second glass layer; a liquid crystal layer between the first substrate and the second substrate; and a sealant layer between the first substrate and the second substrate sealing the first substrate and the second substrate together to form a cell; wherein a first main optical axis of the first glass layer and a second main optical axis of the second glass layer are non-parallel to each other and have an included angle α, α≤90 degrees;

and the sealant layer has a width at a first corner and a second corner greater than that at a third corner and a fourth corner, configured to reduce light leakage and color shift in the fringe field driven liquid crystal display panel; the first corner and the second corner are diagonally opposite to each other; the third corner and the fourth corner are diagonally opposite to each other; and an included angle between a direction from the first corner to the second corner and the first main optical axis is greater than an included angle between the direction from the first corner to the second corner and the second main optical axis.

Optionally, the fringe field driven liquid crystal display panel is an Advanced Super Dimension Switch mode liquid crystal display panel.

In another aspect, the present invention provides a method of determining a direction of an optical axis of a glass layer in a fringe field driven liquid crystal display panel comprising a first substrate comprising a first glass layer; a second substrate facing the first substrate and comprising a second glass layer; and a liquid crystal layer between the first substrate and the second substrate; the method comprising applying a rubbing action in a rubbing area on a surface of the first substrate distal to the second substrate, thereby creating a first tensile stress along a first direction and a second tensile stress along a second direction in or surrounding the rubbing area; observing light leakage in or surrounding the rubbing area along at least one of the first direction and the second direction; and determining the direction of the optical axis of the second glass layer based on the light leakage in or surrounding the rubbing area along at least one of the first direction and the second direction.

Optionally, an increase in the light leakage by the rubbing action in an area in or surrounding the rubbing area and having the first tensile stress along the first direction indicates that the optical axis of the second glass layer is substantially perpendicular to the first direction; and an increase in the light leakage by the rubbing action in an area in or surrounding the rubbing area and having the second tensile stress along the second direction indicates that the optical axis of the second glass layer is substantially parallel to the first direction.

Optionally, applying the rubbing action comprises applying the rubbing action along at least one direction selected from the group consisting of a direction substantially parallel to a lateral side of the fringe field driven liquid crystal display panel, a direction substantially perpendicular to a lateral side of the fringe field driven liquid crystal display panel, and a direction substantially diagonal to a lateral side of the fringe field driven liquid crystal display panel.

Optionally, one of the first direction and the second direction is substantially parallel to the direction of the optical axis of the second glass layer; and one of the first direction and the second direction is substantially perpendicular to the direction of the optical axis of the second glass layer.

Optionally, the fringe field driven liquid crystal display panel is an Advanced Super Dimension Switch mode liquid crystal display panel.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
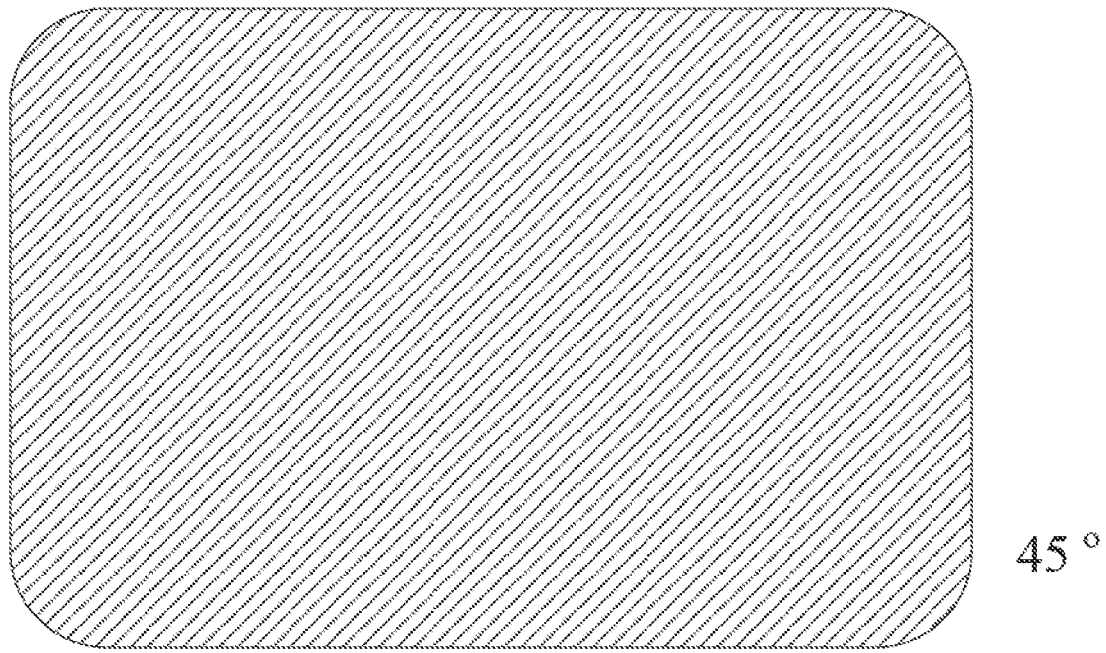
FIG. 1 illustrates a lower glass layer having an optical axis of +45 degrees in a display panel in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional fringe field driven liquid crystal display panels such as a liquid crystal display panel operated in an Advanced Super Dimension Switch mode, darkness non-uniformity (DNU) and edge-side mura occur due to light leakage issues. For example, in a dark state, light leakage occurs in a fringe field driven liquid crystal display panel. Moreover, when a user touches the conventional liquid crystal display panel, light leakage occurs at and around the touching area. Display quality of the liquid crystal display panel is severely affected.

Accordingly, the present disclosure provides, inter alia, a fringe field driven liquid crystal display panel and method of determining a direction of an optical axis of a glass layer in a fringe field driven liquid crystal display panel that substantially obviate one or more of the problems due to limitations and disadvantages of the related art. In one aspect, the present disclosure provides a fringe field driven liquid crystal display panel. In some embodiments, the fringe field driven liquid crystal display panel includes a first substrate comprising a first glass layer and a first alignment film on the first glass layer; a second substrate facing the first substrate and comprising a second glass layer and a second alignment film on the second glass layer; and a liquid crystal layer between the first alignment film and the second alignment film. A first main optical axis of the first glass layer and a second main optical axis of the second glass layer are non-parallel to each other and have an included angle α and the first alignment film and the second alignment film have non-parallel rubbing angles, configured to reduce light leakage and color shift in the fringe field driven liquid crystal display panel. Optionally, the fringe field driven liquid crystal display panel is a flat (e.g., non-curved) fringe field driven liquid crystal display panel.

It is discovered in the present disclosure that the underlying reason for light leakage, color shift, darkness non-uniformity, and edge-side mura in a fringe field driven liquid crystal display panel is the stress-induced birefringence in the upper glass layer and the lower glass layer. Absent of external stress, the glasses are isotropic, e.g., not birefringent. When applied with a stress, the upper glass layer and the lower glass layer become birefringent, and the optical axes of the upper glass layer and the lower glass layer are often non-parallel to each other, resulting in light leakage in the fringe field driven liquid crystal display panel. It is discovered that in the fabricating process of the display panel, the glasses of the display panel may be subject to residual stress, which renders the optical axes of the upper glass layer and the lower glass layer non-parallel to each other. For example, the optical axes of the upper glass layer and the lower glass layer may be perpendicular to each other due to the residual stress introduced in the assembling process. Optionally, the optical axis of the lower glass layer is −45 degrees, and the optical axis of the upper glass layer is +45 degrees. Optionally, the optical axis of the lower glass layer is +45 degrees, and the optical axis of the upper glass layer is −45 degrees.

FIG. 1 illustrates a lower glass layer having an optical axis of +45 degrees in a display panel in some embodiments according to the present disclosure. For example, when the lower glass layer is subject to tensile stress (e.g., due to the residual stress as a result of the assembling process) along the +45-degree direction (e.g., a right diagonal direction), the optical axis of the lower glass layer runs parallel to the orientation of the stress. In another example, when the lower glass layer is subject to compressive stress long the −45-degree direction, the optical axis of the lower glass layer runs perpendicular to the orientation of the stress, e.g., along the +45 degree-direction.

Figure 2:
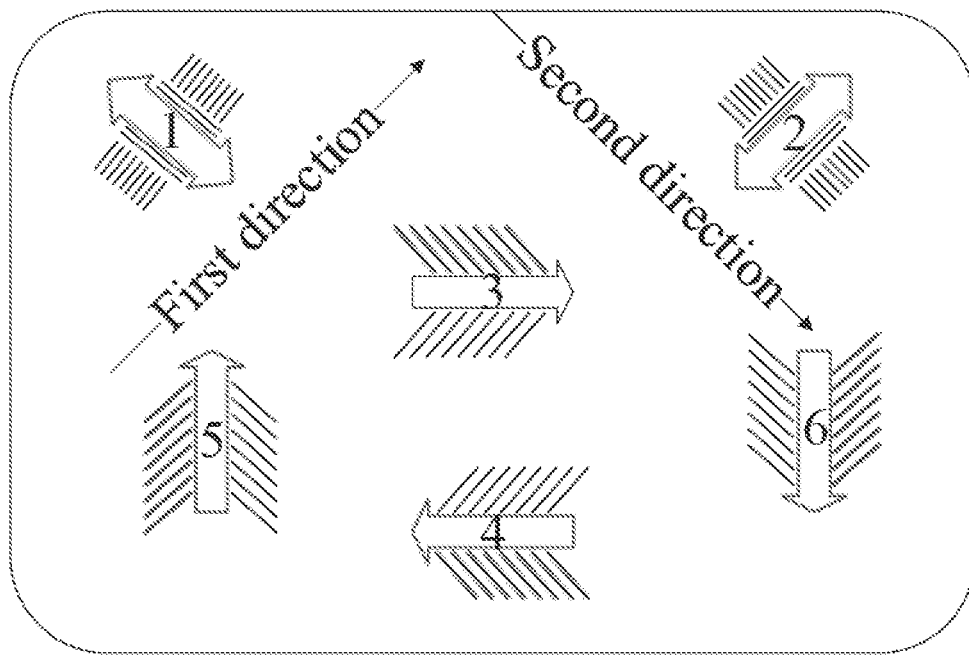
FIG. 2 illustrates rubbing actions applied on an upper glass layer in a display panel having a lower glass layer illustrated in FIG. 1.

FIG. 2 illustrates rubbing actions applied on an upper glass layer in a display panel having a lower glass layer illustrated in FIG. 1. Rubbing actions 1 and 2 run diagonally, e.g., along a left diagonal direction (rubbing action 1) or a right diagonal direction (rubbing action 2). Rubbing actions 3 and 4 run horizontally, and rubbing actions 5 and 6 run vertically. The rubbing actions on the upper glass layer create tensile stress on the upper glass layer, e.g., along a first direction and a second direction. In FIG. 2, the stripes around the rubbing actions show the direction of the tensile stress created by the rubbing actions.

Figure 3:
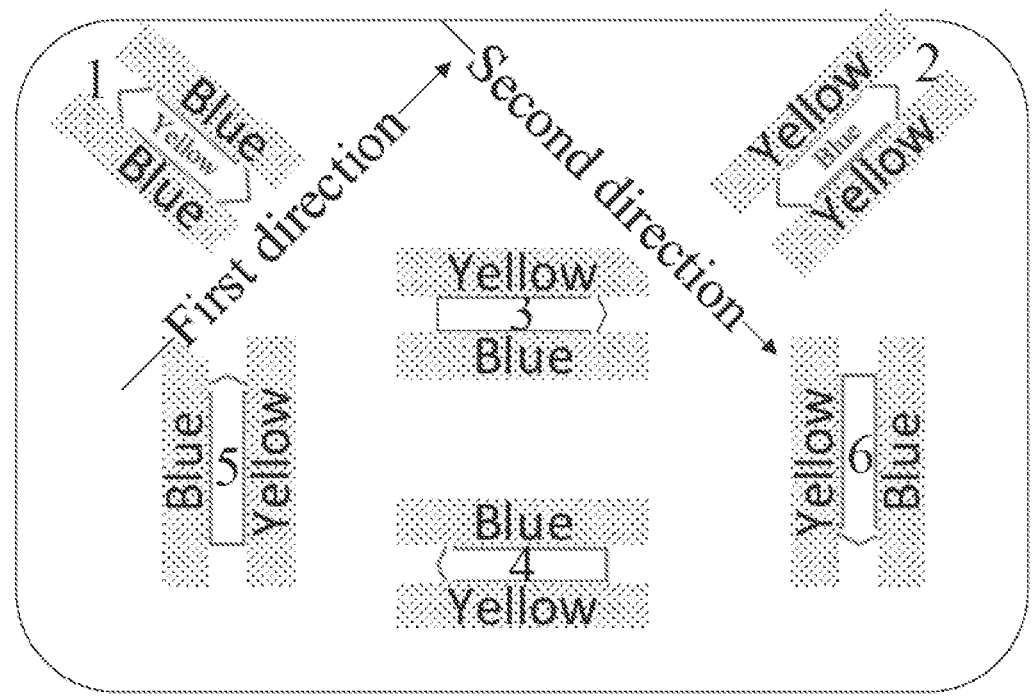
FIG. 3 illustrates light leakage and color shift as a result of the rubbing actions illustrated in FIG. 2.

FIG. 3 illustrates light leakage and color shift as a result of the rubbing actions illustrated in FIG. 2. Referring to FIG. 3, in or surrounding the rubbing areas in which tensile stress created by the rubbing actions runs perpendicular to the optical axis of the lower glass layer, a relatively large light leakage and a yellow color shift are observed. In or surrounding the rubbing areas in which tensile stress created by the rubbing actions runs parallel to the optical axis of the lower glass layer, a relatively small light leakage and a blue color shift (or no light leakage and no color shift) are observed. Thus, by observing the light leakage or color shift in or surrounding the rubbing area along the first direction or along the second direction, the direction of the optical axis of the lower glass layer can be determined. For example, in the rubbing area of rubbing action 1, a large light leakage and a yellow color shift are observed, indicating that the optical axis of the lower glass layer is substantially perpendicular to the second direction. Surrounding the rubbing area of rubbing action 1, a small light leakage and a blue color shift are observed, indicating that the optical axis of the lower glass layer is substantially parallel to the first direction. In another example, in an area above the rubbing action 3, a large light leakage and a yellow color shift are observed, and in an area below the rubbing action 3, a small light leakage and a blue color shift are observed, indicating that the optical axis of the lower glass layer is substantially parallel to the first direction and substantially perpendicular to the second direction.

Figure 4:
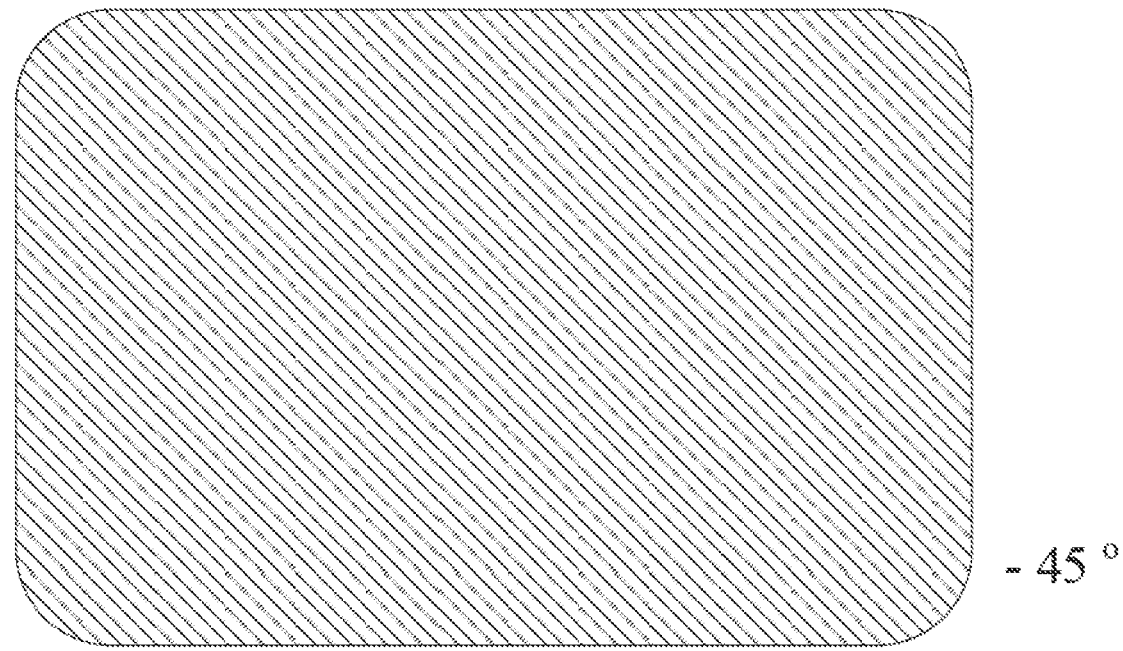
FIG. 4 illustrates a lower glass layer having an optical axis of −45 degrees in a display panel in some embodiments according to the present disclosure.
Figure 5:
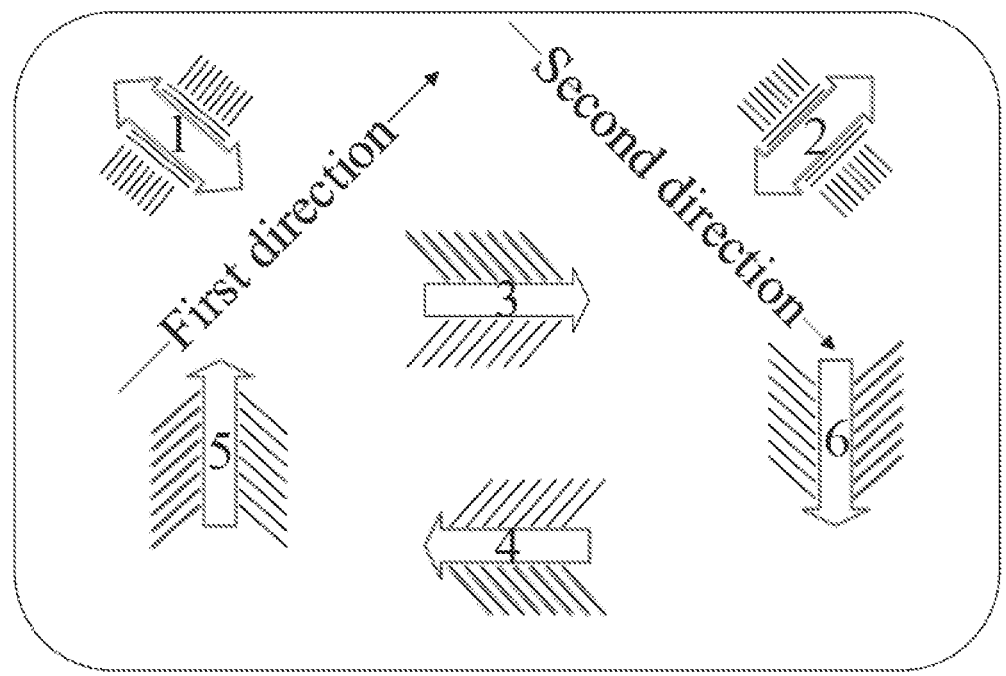
FIG. 5 illustrates rubbing actions applied on an upper glass layer in a display panel having a lower glass layer illustrated in FIG. 4.

FIG. 4 illustrates a lower glass layer having an optical axis of −45 degrees in a display panel in some embodiments according to the present disclosure. For example, when the lower glass layer is subject to tensile stress (e.g., due to the residual stress as a result of the assembling process) along the −45-degree direction (e.g., a left diagonal direction), the optical axis of the lower glass layer runs parallel to the orientation of the stress. In another example, when the lower glass layer is subject to compressive stress long the +45-degree direction, the optical axis of the lower glass layer runs perpendicular to the orientation of the stress, e.g., along the −45 degree-direction. FIG. 5 illustrates rubbing actions applied on an upper glass layer in a display panel having a lower glass layer illustrated in FIG. 4. The rubbing actions are similar to those illustrated in FIG. 2.

Figure 6:
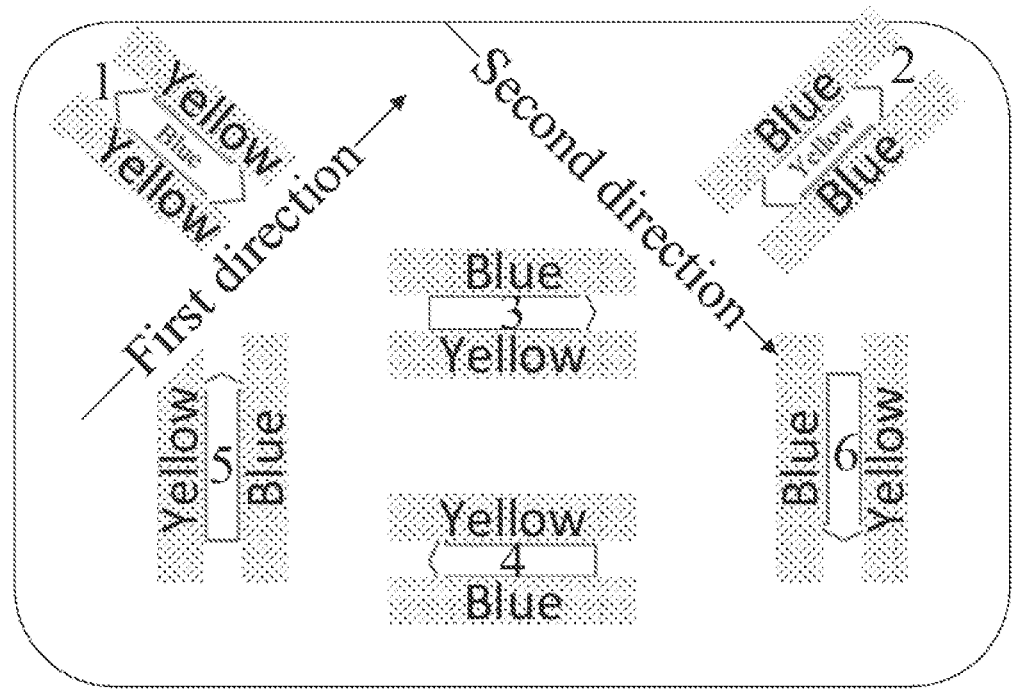
FIG. 6 illustrates light leakage and color shift as a result of the rubbing actions illustrated in FIG. 5.

FIG. 6 illustrates light leakage and color shift as a result of the rubbing actions illustrated in FIG. 5. Referring to FIG. 6, in or surrounding the rubbing areas in which tensile stress created by the rubbing actions runs perpendicular to the optical axis of the lower glass layer, a relatively large light leakage and a yellow color shift are observed. In or surrounding the rubbing areas in which tensile stress created by the rubbing actions runs parallel to the optical axis of the lower glass layer, a relatively small light leakage and a blue color shift (or no light leakage and no color shift) are observed. Thus, by observing the light leakage or color shift in or surrounding the rubbing area along the first direction or along the second direction, the direction of the optical axis of the lower glass layer can be determined. For example, in the rubbing area of rubbing action 1, a small light leakage and a blue color shift are observed, indicating that the optical axis of the lower glass layer is substantially parallel to the second direction. Surrounding the rubbing area of rubbing action 1, a small light leakage and a blue color shift are observed, indicating that the optical axis of the lower glass layer is substantially perpendicular to the first direction. In another example, in an area above the rubbing action 3, a small light leakage and a blue color shift are observed; and in an area below the rubbing action 3, a large light leakage and a yellow color shift are observed, indicating that the optical axis of the lower glass layer is substantially parallel to the second direction and substantially perpendicular to the first direction.

Accordingly, the present disclosure provides a method of determining a direction of an optical axis of a glass layer in a fringe field driven liquid crystal display panel. Optionally, the fringe field driven liquid crystal display panel includes a first substrate having a first glass layer; a second substrate facing the first substrate and having a second glass layer; and a liquid crystal layer between the first substrate and the second substrate. Optionally, a first main optical axis of the first glass layer and a second main optical axis of the second glass layer are non-parallel to each other. In some embodiments, the method includes applying a rubbing action in a rubbing area on a surface of the first substrate distal to the second substrate, thereby creating a first tensile stress along a first direction and a second tensile stress along a second direction in or surrounding the rubbing area; observing light leakage in or surrounding the rubbing area along at least one of the first direction and the second direction; and determining the direction of the optical axis of the second glass layer based on the light leakage in or surrounding the rubbing area along at least one of the first direction and the second direction. An increase in the light leakage by the rubbing action in an area in or surrounding the rubbing area and having the first tensile stress along the first direction indicates that the optical axis of the second glass layer is substantially perpendicular to the first direction and substantially parallel to the second direction. An increase in the light leakage by the rubbing action in an area in or surrounding the rubbing area and having the second tensile stress along the second direction indicates that the optical axis of the second glass layer is substantially parallel to the first direction and substantially perpendicular to the second direction. Optionally, a yellow color shift as a result of the rubbing action in an area in or surrounding the rubbing area and having the first tensile stress along the first direction indicates that the optical axis of the second glass layer is substantially perpendicular to the first direction and substantially parallel to the second direction. Optionally, a blue color shift as a result of the rubbing action in an area in or surrounding the rubbing area and having the first tensile stress along the first direction indicates that the optical axis of the second glass layer is substantially parallel to the first direction and substantially perpendicular to the second direction. Optionally, a yellow color shift as a result of the rubbing action in an area in or surrounding the rubbing area and having the second tensile stress along the second direction indicates that the optical axis of the second glass layer is substantially parallel to the first direction and substantially perpendicular to the second direction. Optionally, a blue color shift as a result of the rubbing action in an area in or surrounding the rubbing area and having the second tensile stress along the second direction indicates that the optical axis of the second glass layer is substantially perpendicular to the first direction and substantially parallel to the second direction.

Optionally, the rubbing action is a rubbing action along a direction substantially parallel to a lateral side of the liquid crystal display panel. Optionally, the rubbing action is a rubbing action along a direction substantially perpendicular to a lateral side of the liquid crystal display panel. Optionally, the rubbing action is a rubbing action along a direction substantially diagonal to a lateral side of the liquid crystal display panel. Optionally, the rubbing action is a rubbing action along a direction substantially left diagonal to a lateral side of the liquid crystal display panel. Optionally, the rubbing action is a rubbing action along a direction substantially right diagonal to a lateral side of the liquid crystal display panel. Optionally, the rubbing action is a uni-directional rubbing action (e.g., the rubbing actions 3, 4, 5, and 6 in FIG. 2 and FIG. 4). Optionally, the rubbing action is a bi-directional rubbing action (e.g., the rubbing actions 1 and 2 in FIG. 2 and FIG. 4).

In some embodiments, one of the first direction and the second direction is substantially parallel to the direction of the optical axis of the second glass layer; and one of the first direction and the second direction is substantially perpendicular to the direction of the optical axis of the second glass layer. Optionally, the first direction is substantially parallel to the direction of the optical axis of the second glass layer, and the second direction is substantially perpendicular to the direction of the optical axis of the second glass layer (FIG. 1). Optionally, the first direction is substantially perpendicular to the direction of the optical axis of the second glass layer, and the second direction is substantially parallel to the direction of the optical axis of the second glass layer (FIG. 3). Optionally, the first direction is a +45-degree-direction, and the second direction is a −45-degree direction (FIG. 2). Optionally, the first direction is a −45-degree direction, and the second direction is a +45-degree-direction. Optionally, the method of determining a direction of an optical axis of a glass layer in a fringe field driven liquid crystal display panel is a method of determining a direction of an optical axis of a glass layer in a fringe field driven liquid crystal display panel in a normally dark state.

Once the direction of the optical axis of the lower glass layer (and thus the direction of the optical axis of the upper glass layer) is determined, the light leakage and color shift in the fringe field driven liquid crystal display panel can be reduced. In another aspect, the present disclosure further provides a method of reducing light leakage and color shift in a fringe field driven liquid crystal display panel. In some embodiments, the method includes compensating a twist angle of the liquid crystal layer. Optionally, the method includes compensating the twist angle of the liquid crystal layer by a value of $$\left(\sin\frac{\alpha}{2}\right)^2 * \left(\frac{ret}{\lambda}\right) * 360,$$

wherein α is a non-zero included angle between a first main optical axis of a first glass layer (e.g., an upper glass layer) and a second main optical axis of a second glass layer (e.g., a lower glass layer); and ret is an optical retardation value of the first glass layer and the second glass layer. Optionally, ret is substantially equal to (SOC1*Δσ1*t1)+(SOC2*Δσ2*t2) wherein SOC1 is the stress optical coefficient value of the first glass layer; SOC2 is the stress optical coefficient value of the second glass layer; Δσ1 is principal stress difference value of the first glass layer; Δσ2 is principal stress difference value of the second glass layer; t1 is a thickness of the first glass layer; t2 is a thickness of the second glass layer; and λ is a wavelength of incident light. Optionally, α is substantially 90 degrees; and Δθ is substantially equal to $$\frac{(SOC1*\Delta\sigma1*t1) + (SOC2*\Delta\sigma2*t2)}{\lambda} * 180.$$

Optionally, the fringe field driven liquid crystal display panel is an Advanced Super Dimension Switch mode liquid crystal display panel. Optionally, the lower glass layer is a glass layer (e.g., a base substrate) of an array substrate.

Optionally, the upper glass layer is a glass layer (e.g., a base substrate) of a counter substrate facing the array substrate.

Figure 7:
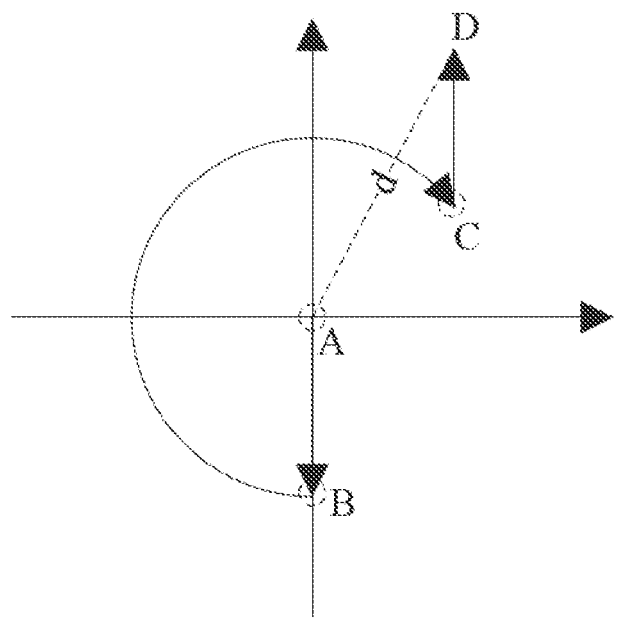
FIG. 7 illustrates an optical rotation effect in a fringe field driven liquid crystal display panel having a lower glass layer illustrated in FIG. 4.

FIG. 7 illustrates an optical rotation effect in a fringe field driven liquid crystal display panel having a lower glass layer illustrated in FIG. 4. In the fringe field driven liquid crystal display panel illustrated in FIG. 7, the lower glass layer has an optical retardation value of approximately 3 nm substantially along the −45 degrees direction, i.e., (SOC2*Δσ2*t2)=3 nm; and the upper glass layer has an optical retardation value of approximately 3 nm substantially along the +45 degrees direction, i.e., (SOC1*Δσ1*t1)=3 nm. The optical axis of the upper glass layer is +45 degrees and the optical axis of the lower glass layer is −45 degrees. The optical retardation value of the liquid crystal layer is approximately 350 nm, i.e., Δn×d=−350 nm. As shown in FIG. 7, the point A stands for the input light, point D stands for the output light. The arrow from point A to point B indicates the optical rotation effect of the lower glass layer of the fringe field driven liquid crystal display panel, the arrow from point B to point C indicates the optical rotation effect of the liquid crystal layer, and the arrow from point C to point D indicates the optical rotation effect of the upper glass layer of the fringe field driven liquid crystal display panel. As shown in FIG. 7, the input light has been rotated three times, and is diverged far from the original light at point A. The light leakage of the fringe field driven liquid crystal display panel correlates with a distance d between point A and point D.

Figure 8:
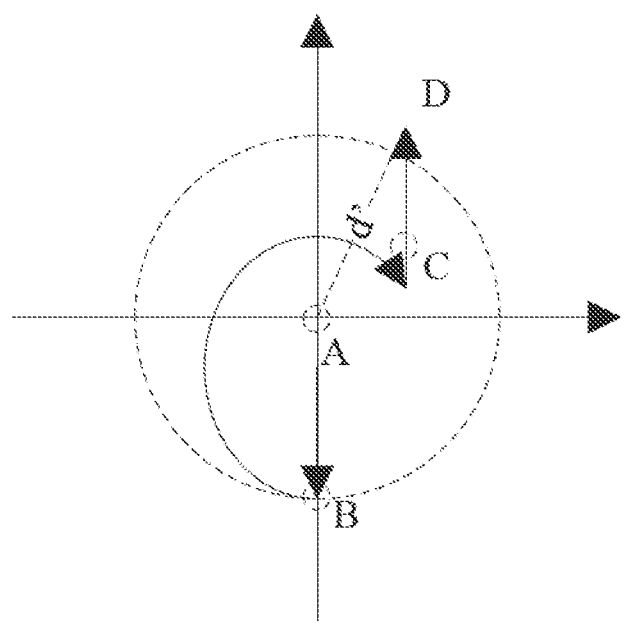
FIG. 8 illustrates an optical rotation effect in a fringe field driven liquid crystal display panel having a lower glass layer illustrated in FIG. 4 in which a twist angle of the liquid crystal layer is compensated.

FIG. 8 illustrates an optical rotation effect in a fringe field driven liquid crystal display panel having a lower glass layer illustrated in FIG. 4 in which a twist angle of the liquid crystal layer is compensated. In the fringe field driven liquid crystal display panel illustrated in FIG. 8, the lower glass layer has an optical retardation value of approximately 3 nm substantially along the −45 degrees direction, i.e., (SOC2*Δσ2*t2)=3 nm; and the upper glass layer also has an optical retardation value of approximately 3 nm substantially along the +45 degrees direction, i.e., (SOC1*Δσ1*t1)=3 nm. The optical axis of the upper glass layer is +45 degrees and the optical axis of the lower glass layer is −45 degrees. The twist angle of the liquid crystal layer is compensated for, e.g., approximately −3 degrees, approximately −2 degrees, and approximately −1 degrees. The arrow from point A to point B indicates the optical rotation effect of the lower glass layer of the fringe field driven liquid crystal display panel, the arrow from point B to point C indicates the optical rotation effect of the liquid crystal layer, and the arrow from point C to point D indicates the optical rotation effect of the upper glass layer of the fringe field driven liquid crystal display panel. As shown in FIG. 8, compensation of the twist angle of the liquid crystal layer dramatically changed the optical rotation effect of the liquid crystal layer. As a result, the distance d' between point A and point D is much shorter as compared to the distance d between point A and point D in FIG. 7. As the light leakage of the fringe field driven liquid crystal display panel correlates with the distance d' between point A and point D, the light leakage is much reduced. Color shift issue is also obviated.

Figure 9:
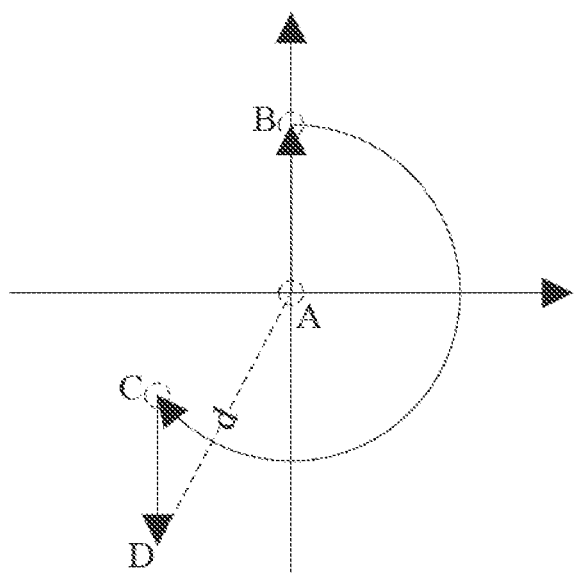
FIG. 9 illustrates an optical rotation effect in a fringe field driven liquid crystal display panel having a lower glass layer illustrated in FIG. 1.

FIG. 9 illustrates an optical rotation effect in a fringe field driven liquid crystal display panel having a lower glass layer illustrated in FIG. 1. In the fringe field driven liquid crystal display panel illustrated in FIG. 9, the lower glass layer has an optical retardation value of approximately 3 nm substantially along the +45 degrees direction, i.e., (SOC2*Δσ2*t2)=3 nm; and the upper glass layer also has an optical retardation value of approximately 3 nm substantially along the −45 degrees direction, i.e., (SOC1*Δσ1*t1)=−3 nm. The optical axis of the upper glass layer is −45 degrees and the optical axis of the lower glass layer is +45 degrees. The optical retardation of the liquid crystal layer is approximately 350 nm, i.e., Δn×d=−350 nm. As shown in FIG. 9, the point A stands for the input light, point D stands for the output light. The arrow from point A to point B indicates the optical rotation effect of the lower glass layer of the fringe field driven liquid crystal display panel, the arrow from point B to point C indicates the optical rotation effect of the liquid crystal layer, and the arrow from point C to point D indicates the optical rotation effect of the upper glass layer of the fringe field driven liquid crystal display panel. As shown in FIG. 9, the input light has been rotated three times, and is diverged far from the original light at point A. The light leakage of the fringe field driven liquid crystal display panel correlates with a distance d between point A and point D.

Figure 10:
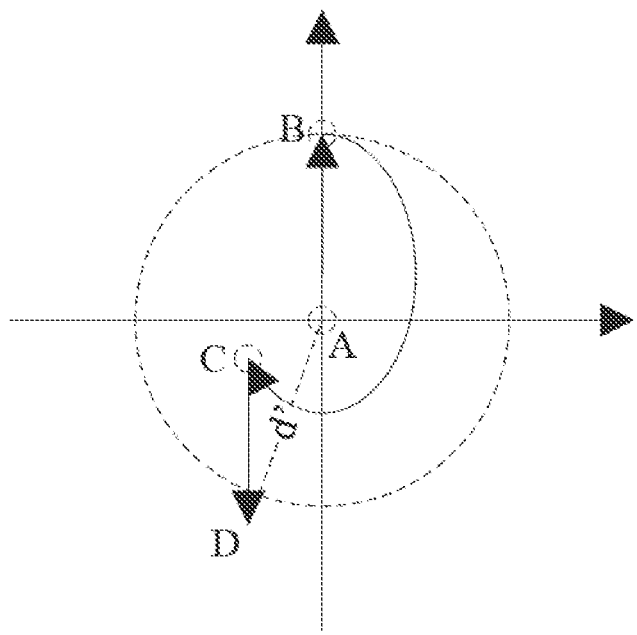
FIG. 10 illustrates an optical rotation effect in a fringe field driven liquid crystal display panel having a lower glass layer illustrated in FIG. 1 in which a twist angle of the liquid crystal layer is compensated.

FIG. 10 illustrates an optical rotation effect in a fringe field driven liquid crystal display panel having a lower glass layer illustrated in FIG. 1 in which a twist angle of the liquid crystal layer is compensated. In the fringe field driven liquid crystal display panel illustrated in FIG. 10, the lower glass layer has an optical retardation value of approximately 3 nm, i.e., (SOC2*Δσ2*t2)=−3 nm; and the upper glass layer also has an optical retardation value of approximately—3 nm, i.e., (SOC1*Δσ1*t1)=−3 nm. The optical axis of the upper glass layer is −45 degrees and the optical axis of the lower glass layer is +45 degrees. The twist angle of the liquid crystal layer is compensated for, e.g., approximately +3 degrees, approximately +2 degrees, and approximately +1 degrees. The arrow from point A to point B indicates the optical rotation effect of the lower glass layer of the fringe field driven liquid crystal display panel, the arrow from point B to point C indicates the optical rotation effect of the liquid crystal layer, and the arrow from point C to point D indicates the optical rotation effect of the upper glass layer of the fringe field driven liquid crystal display panel. As shown in FIG. 10, compensation of the twist angle of the liquid crystal layer dramatically changed the optical rotation effect of the liquid crystal layer. As a result, the distance d' between point A and point D is much shorter as compared to the distance d between point A and point D in FIG. 9. As the light leakage of the fringe field driven liquid crystal display panel correlates with the distance d' between point A and point D, the light leakage is much reduced. Color shift issue is also obviated.

In some embodiments, the main optical axis of the upper glass layer and the main optical axis of the lower glass layer are substantially orthogonal to each other, and a first orientation of a first optical retardation of the upper glass layer and a second orientation of a second optical retardation of the lower glass layer are substantially orthogonal to each other. Optionally, the method of reducing light leakage and color shift in a fringe field driven liquid crystal display panel is a method of reducing light leakage and color shift in a fringe field driven liquid crystal display panel in a normally dark state.

Optionally, the main optical axis of the upper glass layer is 45 degrees, and the main optical axis of the lower glass layer is −45 degrees. Optionally, the step of compensating the twist angle of the liquid crystal layer includes compensating the twist angle by a value of $$-\left(\frac{180*SOC1*\Delta\sigma1*t1}{\lambda} + \frac{180*SOC2*\Delta\sigma2*t2}{\lambda}\right).$$

SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer; and $\lambda$ is a wavelength of incident light. Optionally, $\lambda$ is 550 nm.

Optionally, the main optical axis of the upper glass layer is −45 degrees, and the main optical axis of the lower glass layer is 45 degrees. Optionally, the step of compensating the twist angle of the liquid crystal layer includes compensating the twist angle by a value of $$+\left(\frac{180*SOC1*\Delta\sigma1*t1}{\lambda} + \frac{180*SOC2*\Delta\sigma2*t2}{\lambda}\right).$$

SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer; and $\lambda$ is a wavelength of incident light. Optionally, $\lambda$ is 550 nm.

Various appropriate methods may be used to compensate the twist angle of the liquid crystal layer. In some embodiments, the twist angle of the liquid crystal layer may be compensated by applying a first rubbing angle to a first alignment film on the upper glass layer and applying a second rubbing angle to a second alignment film on the lower glass layer. The first rubbing angle and the second rubbing angle are configured so that the twist angle of the liquid crystal layer is compensated. Optionally, the method includes applying the first rubbing angle to the first alignment film (e.g., an alignment film of the upper glass layer) and applying the second rubbing angle to the second alignment film (e.g., an alignment film of the lower glass layer) such that the first rubbing angle and the second rubbing angle are non-parallel to each other, e.g., having a non-zero included angle $\Delta\theta$, thereby reducing light leakage and color shift in the fringe field driven liquid crystal display panel. Optionally, the $\Delta\theta$ is substantially equal to $$\left(\sin\frac{\alpha}{2}\right)^2 * \left(\frac{ret}{\lambda}\right) * 360,$$

wherein $\alpha$ is a non-zero included angle between a first main optical axis of a first glass layer (e.g., an upper glass layer) and a second main optical axis of a second glass layer (e.g., a lower glass layer); and ret is an optical retardation value of the first glass layer and the second glass layer. Optionally, ret is substantially equal to $(SOC1*\Delta\sigma1*t1)+(SOC2*\Delta\sigma2*t2)$ $(SOC1*\Delta\sigma1*t1)+(SOC2*\Delta\sigma2*t2)$; wherein SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer, and $\lambda$ is a wavelength of incident light. Optionally, $\alpha$ is substantially 90 degrees; and $\Delta\theta$ is substantially equal to $$\frac{(SOC1*\Delta\sigma1*t1)+(SOC2*\Delta\sigma2*t2)}{\lambda}*180.$$

Optionally, $\lambda$ is 550 nm. Optionally, $\Delta\sigma1$ and $\Delta\sigma2$ may be determined by simulation experiments. SOC1 and SOC2 are constants associated with the glasses.

In a conventional fringe field driven liquid crystal display panel, e.g., a conventional Advanced Super Dimension Switch mode liquid crystal display panel, the first rubbing angle and the second rubbing angle are normally parallel to each other. In the present method, the first rubbing angle and the second rubbing angle shifted relative to each other so that they are not parallel to each other in order to compensate the twist angle of the liquid crystal layer. In one example, the twist angle of the liquid crystal layer is compensated for −2 degrees; the first rubbing angle is rotated by +1 degree, and the second rubbing angle is rotated by −1 degree, e.g., from an orientation in which the first rubbing angle and the second rubbing angle would be parallel to each other. In another example, the twist angle of the liquid crystal layer is compensated for +2 degrees; the first rubbing angle is rotated by −1 degree, and the second rubbing angle is rotated by +1 degree, e.g., from an orientation in which the first rubbing angle and the second rubbing angle would be parallel to each other.

In one example, the first main optical axis of the upper glass layer is 45 degrees, and the second main optical axis of the lower glass layer is −45 degrees. Optionally, the method includes applying the first rubbing angle to the first alignment film on the upper glass layer and applying the second rubbing angle to the second alignment film on the lower glass layer so that the first rubbing angle of the first alignment film and the second rubbing angle of the second alignment film are equally rotated from a reference orientation. Optionally, the step of applying the first rubbing angle to the first alignment film on the upper glass layer is performed so that the first rubbing angle is rotated relative to the reference orientation by a value of $$-\frac{180*SOC1*\Delta\sigma1*t1}{\lambda}.$$

Optionally, the step of applying the second rubbing angle to the second alignment film on the lower glass layer is performed so that the second rubbing angle is rotated relative to the reference orientation by a value of $$+\frac{180*SOC2*\Delta\sigma2*t2}{\lambda}.$$

SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer; and $\lambda$ is a wavelength of incident light. Optionally, $\lambda$ is 550 nm.

In another example, the first main optical axis of the upper glass layer is −45 degrees, and the second main optical axis of the lower glass layer is 45 degrees. Optionally, the method includes applying the first rubbing angle to the first alignment film on the upper glass layer and applying the second rubbing angle to the second alignment film on the lower glass layer so that the first rubbing angle of the first alignment film and the second rubbing angle of the second alignment film are equally rotated from a reference orientation. Optionally, the step of applying the first rubbing angle to the first alignment film on the upper glass layer is performed so that the first rubbing is rotated relative to the reference orientation by a value of $$+\frac{180*SOC2*\Delta\sigma2*t2}{\lambda}.$$

Optionally, the step of applying the second rubbing angle to the second alignment film on the lower glass layer is performed so that the second rubbing angle is rotated relative to the reference orientation by a value of $$-\frac{180*SOC1*\Delta\sigma1*t1}{\lambda}.$$

SOC1 is the stress optical coefficient value of the first glass layer; SOC2 is the stress optical coefficient value of the second glass layer; Δσ1 is principal stress difference value of the first glass layer; Δσ2 is principal stress difference value of the second glass layer; t1 is a thickness of the first glass layer; t2 is a thickness of the second glass layer; and λ is a wavelength of incident light. Optionally, λ is 550 nm.

In some embodiments, the fringe field driven liquid crystal display panel further includes a first polarizer on a side of the first substrate distal to the second substrate, the first polarizer having a first polarization direction, and a second polarizer on a side of the second substrate distal to the first substrate, the second polarizer having a second polarization direction. Optionally, the second polarization direction is substantially orthogonal to the first polarization direction.

In some embodiments, the step of applying the first rubbing angle to the first alignment film and the step of applying the second rubbing angle to the second alignment film are performed so that the first main optical axis is at an acute angle in clock-wise direction with respect to the first polarization direction in plan view of the fringe field driven liquid crystal display panel; the second main optical axis is at an acute angle in counter-clock-wise direction with respect to the first polarization direction in plan view of the fringe field driven liquid crystal display panel; the first rubbing angle is at an acute angle in counter-clock-wise direction with respect to the first polarization direction in plan view of the fringe field driven liquid crystal display panel; and the second rubbing angle is at an acute angle in clock-wise direction with respect to the first polarization direction in plan view of the fringe field driven liquid crystal display panel. Optionally, the first main optical axis is at 45 degrees in clock-wise direction with respect to the first polarization direction in plan view of the fringe field driven liquid crystal display panel; the second main optical axis is at 45 degrees in counter-clock-wise direction with respect to the first polarization direction in plan view of the fringe field driven liquid crystal display panel; the first rubbing angle is at an acute angle of $$\frac{(SOC1*\Delta\sigma1*t1)}{\lambda}*180$$

in counter-clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

in clock-wise direction with respect to the first polarization direction in plan view of the fringe field driven liquid crystal display panel.

In some embodiments, the step of applying the first rubbing angle to the first alignment film and the step of applying the second rubbing angle to the second alignment film are performed so that the first main optical axis is at an acute angle in counter-clock-wise direction with respect to the first polarization direction in plan view of the fringe field driven liquid crystal display panel; the second main optical axis is at an acute angle in clock-wise direction with respect to the first polarization direction in plan view of the fringe field driven liquid crystal display panel; the first rubbing angle is at an acute angle in clock-wise direction with respect to the first polarization direction in plan view of the fringe field driven liquid crystal display panel; and the second rubbing angle is at an acute angle in counter-clock-wise direction with respect to the first polarization direction in plan view of the fringe field driven liquid crystal display panel. Optionally, the first main optical axis is at 45 degrees in counter-clock-wise direction with respect to the first polarization direction in plan view of the fringe field driven liquid crystal display panel; the second main optical axis is at 45 degrees in clock-wise direction with respect to the first polarization direction in plan view of the fringe field driven liquid crystal display panel; the first rubbing angle is at an acute angle of $$\frac{(SOC1*\Delta\sigma1*t1)}{\lambda}*180$$

in clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

in counter-clock-wise direction with respect to the first polarization direction in plan view of the fringe field driven liquid crystal display panel.

In some embodiments, the step of applying the first rubbing angle to the first alignment film and the step of applying the second rubbing angle to the second alignment film are performed so that the second main optical axis is at an acute angle or a right angle in counter-clock-wise direction with respect to the first main optical axis in plan view of the fringe field driven liquid crystal display panel; and the second rubbing angle is at an acute angle in clock-wise direction with respect to the first rubbing angle in plan view of the fringe field driven liquid crystal display panel. Optionally, the second main optical axis is at substantially 90 degrees in counter-clock-wise direction with respect to the first main optical axis in plan view of the fringe field driven liquid crystal display panel; the first rubbing angle is at an acute angle of $$\frac{(SOC1*\Delta\sigma1*t1)}{\lambda}*180$$

in counter-clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

in clock-wise direction with respect to the first polarization direction in plan view of the fringe field driven liquid crystal display panel.

In some embodiments, the step of applying the first rubbing angle to the first alignment film and the step of applying the second rubbing angle to the second alignment film are performed so that the second main optical axis is at an acute angle or a right angle in clock-wise direction with respect to the first main optical axis in plan view of the fringe field driven liquid crystal display panel; and the second rubbing angle is at an acute angle in counter-clock-wise direction with respect to the first rubbing angle in plan view of the fringe field driven liquid crystal display panel. Optionally, the second main optical axis is at substantially 90 degrees in clock-wise direction with respect to the first main optical axis in plan view of the fringe field driven liquid crystal display panel; the first rubbing angle is at an acute angle of $$\frac{(SOC1*\Delta\sigma1*t1)}{\lambda}*180$$

in clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

in counter-clock-wise direction with respect to the first polarization direction in plan view of the fringe field driven liquid crystal display panel.

In some embodiments, the twist angle of the liquid crystal layer may be compensated by at least one compensation plate configured to reduce light leakage and color shift in the fringe field driven liquid crystal display panel. Optionally, the fringe field driven liquid crystal display panel further includes a first polarizer on a side of the first substrate distal to the second substrate, the first polarizer having the first polarization direction; and a second polarizer on a side of the second substrate distal to the first substrate, the second polarizer having the second polarization direction. Optionally, a first main optical axis of the first glass layer and a second main optical axis of the second glass layer are non-parallel to each other and have an included angle α.

In some embodiments, the step of compensating the twist angle of the liquid crystal layer includes adding a compensation plate in the fringe field driven liquid crystal display panel. Optionally, the step of compensating the twist angle of the liquid crystal layer includes adding a first compensation plate on a side of the first substrate distal to the second substrate. The first compensation plate has a first retardation along a direction substantially orthogonal to the first main optical axis of the first glass layer; and the first retardation has an absolute value substantially the same as a retardation value of the first glass layer. Optionally, the step of compensating the twist angle of the liquid crystal layer includes adding a second compensation plate on a side of the second substrate distal to the first substrate. The second compensation plate has a second retardation along a direction substantially orthogonal to the second main optical axis of the second glass layer; and the second retardation has an absolute value substantially the same as a retardation value of the second glass layer. Optionally, the step of compensating the twist angle of the liquid crystal layer includes adding a first compensation plate on a side of the first substrate distal to the second substrate and adding a second compensation plate on a side of the second substrate distal to the first substrate. The first compensation plate has a first retardation along a direction substantially orthogonal to the first main optical axis of the first glass layer; the first retardation has an absolute value substantially the same as a retardation value of the first glass layer; the second compensation plate has a second retardation along a direction substantially orthogonal to the second main optical axis of the second glass layer; and the second retardation has an absolute value substantially the same as a retardation value of the second glass layer. Optionally, the compensation plate is an A-plate. Optionally, the method of reducing light leakage and color shift in a fringe field driven liquid crystal display panel is a method of reducing light leakage and color shift in a fringe field driven liquid crystal display panel in a normally dark state. Optionally, the method of reducing light leakage and color shift in a fringe field driven liquid crystal display panel is a method of reducing or eliminating darkness non-uniformity in a fringe field driven liquid crystal display panel. Optionally, the fringe field driven liquid crystal display panel is an Advanced Super Dimension Switch mode liquid crystal display panel.

In some embodiments, the at least one compensation plate is integral with at least one of the first polarizer and the second polarizer. Optionally, the first compensation plate is integral with the first polarizer. The first polarizer has a first retardation along a direction substantially orthogonal to the first main optical axis of the first glass layer; and the first retardation has an absolute value substantially the same as a retardation value of the first glass layer. Optionally, the second compensation plate is integral with the second polarizer. The second polarizer has a second retardation along a direction substantially orthogonal to the second main optical axis of the second glass layer; and the second retardation has an absolute value substantially the same as a retardation value of the second glass layer. Optionally, the first compensation plate is integral with the first polarizer, and the second compensation plate is integral with the second polarizer. The first polarizer has a first retardation along a direction substantially orthogonal to the first main optical axis of the first glass layer; the first retardation has an absolute value substantially the same as a retardation value of the first glass layer; the second polarizer has a second retardation along a direction substantially orthogonal to the second main optical axis of the second glass layer; and the second retardation has an absolute value substantially the same as a retardation value of the second glass layer.

In some embodiments, the step of compensating the twist angle of the liquid crystal layer includes forming or modifying a sealant layer of the fringe field driven liquid crystal display panel to reduce light leakage and color shift in the fringe field driven liquid crystal display panel. Optionally, the fringe field driven liquid crystal display panel includes a first substrate comprising a first glass layer; a second substrate facing the first substrate and comprising a second glass layer; a liquid crystal layer between the first substrate and the second substrate; and a sealant layer between the first substrate and the second substrate sealing the first substrate and the second substrate together to form a cell. A first main optical axis of the first glass layer and a second main optical axis of the second glass layer are non-parallel to each other and have an included angle $\alpha$, $\alpha \leq 90$ degrees. Optionally, the step of compensating the twist angle of the liquid crystal layer includes forming a sealant layer having a width at a first corner and a second corner greater than that at a third corner and a fourth corner. The first corner and the second corner are diagonally opposite to each other, the third corner and the fourth corner are diagonally opposite to each other, and an included angle between a direction from the first corner to the second corner and the first main optical axis is greater than an included angle between the direction from the first corner to the second corner and the second main optical axis. Optionally, the fringe field driven liquid crystal display panel is an Advanced Super Dimension Switch mode liquid crystal display panel.

In another aspect, the present disclosure provides a fringe field driven liquid crystal display panel. In some embodiments, the fringe field driven liquid crystal display panel includes a first substrate having a first glass layer and a first alignment film on the first glass layer; a second substrate facing the first substrate and having a second glass layer and a second alignment film on the second glass layer; and a liquid crystal layer between the first alignment film and the second alignment film. Optionally, a first main optical axis of the first glass layer and a second main optical axis of the second glass layer are non-parallel to each other, and have an included angle $\alpha$. Optionally, the first alignment film and the second alignment film have non-parallel rubbing angles, configured to reduce light leakage and color shift in the fringe field driven liquid crystal display panel. Light leakage, color shift, darkness non-uniformity, and edge-side mum are significantly reduced or eliminated in the present fringe field driven liquid crystal display panel.

In some embodiments, a difference $\Delta\theta$ between a first rubbing angle of the first alignment film and a second rubbing angle of the second alignment film is substantially equal to $$\left(\sin\frac{\alpha}{2}\right)^2 + \left(\frac{ret}{\lambda}\right)*360;$$

wherein ret is an optical retardation value of the first glass layer and the second glass layer. Optionally, ret is substantially equal to $(SOC1*\Delta\sigma1*t1)+(SOC2*\Delta\sigma2*t2)$. Optionally, SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer; and $\lambda$ is a wavelength of incident light.

In some embodiments, the first main optical axis of the first glass layer and the second main optical axis of the second glass layer are substantially orthogonal to each other; and $\Delta\theta$ is substantially equal to $$\frac{(SOC1*\Delta\sigma1*t1)+(SOC2*\Delta\sigma2*t2)}{\lambda}*180.$$

In some embodiments, the fringe field driven liquid crystal display panel further includes a first polarizer on a side of the first substrate distal to the second substrate, the first polarizer having a first polarization direction; and a second polarizer on a side of the second substrate distal to the first substrate, the second polarizer having a second polarization direction. Optionally, the first main optical axis is at an acute angle in clock-wise direction with respect to the first polarization direction in plan view of the fringe field driven liquid crystal display panel; the second main optical axis is at an acute angle in counter-clock-wise direction with respect to the first polarization direction in plan view of the fringe field driven liquid crystal display panel; the first rubbing angle is at an acute angle in counter-clock-wise direction with respect to the first polarization direction in plan view of the fringe field driven liquid crystal display panel; and the second rubbing angle is at an acute angle in clock-wise direction with respect to the first polarization direction in plan view of the fringe field driven liquid crystal display panel. Optionally, the first main optical axis of the first glass layer is at 45 degrees in clock-wise direction with respect to the first polarization direction in plan view of the fringe field driven liquid crystal display panel; the second main optical axis of the second glass layer is at substantially 45 degrees in counter-clock-wise direction with respect to the first polarization direction in plan view of the fringe field driven liquid crystal display panel; the first rubbing angle is at an acute angle of $$\frac{(SOC1*\Delta\sigma1*t1)}{\lambda}*180$$

in counter-clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

clock-wise direction with respect to the first polarization direction in plan view of the fringe field driven liquid crystal display panel. Optionally, the first main optical axis is at an acute angle in counter-clock-wise direction with respect to the first polarization direction in plan view of the fringe field driven liquid crystal display panel; the second main optical axis is at an acute angle in clock-wise direction with respect to the first polarization direction in plan view of the fringe field driven liquid crystal display panel; the first rubbing angle is at an acute angle in clock-wise direction with respect to the first polarization direction in plan view of the fringe field driven liquid crystal display panel; and the second rubbing angle is at an acute angle in counter-clock-wise direction with respect to the first polarization direction in plan view of the fringe field driven liquid crystal display panel. Optionally, the first main optical axis of the first glass layer is at 45 degrees in counter-clock-wise direction with respect to the first polarization direction in plan view of the fringe field driven liquid crystal display panel, the second main optical axis of the second glass layer is at substantially 45 degrees in clock-wise direction with respect to the first polarization direction in plan view of the fringe field driven liquid crystal display panel; the first rubbing angle is at an acute angle of $$\frac{(SOC1*\Delta\sigma1*t1)}{\lambda}*180$$

in clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

in counter-clock-wise direction with respect to the first polarization direction in plan view of the fringe field driven liquid crystal display panel. SOC1 is the stress optical coefficient value of the first glass layer; SOC2 is the stress optical coefficient value of the second glass layer; $\Delta\sigma1$ is principal stress difference value of the first glass layer; $\Delta\sigma2$ is principal stress difference value of the second glass layer; t1 is a thickness of the first glass layer; t2 is a thickness of the second glass layer; and $\lambda$ is a wavelength of incident light. Optionally, $\lambda$ is 550 nm.

In some embodiments, the second main optical axis is at an acute angle or a right angle in counter-clock-wise direction with respect to the first main optical axis in plan view of the fringe field driven liquid crystal display panel; and the second rubbing angle is at an acute angle in clock-wise direction with respect to the first rubbing angle in plan view of the fringe field driven liquid crystal display panel. Optionally, the second main optical axis is at substantially 90 degrees in counter-clock-wise direction with respect to the first main optical axis in plan view of the fringe field driven liquid crystal display panel; the first rubbing angle is at an acute angle of $$\frac{(SOC1*\Delta\sigma1*t1)}{\lambda}*180$$

in counter-clock-wise direction with respect to the first polarization direction in plan view of the fringe field driven liquid crystal display panel; and the second rubbing angle is at an acute angle of $$\frac{(SOC2*\Delta\sigma2*t2)}{\lambda}*180$$

in clock-wise direction with respect to the first polarization direction in plan view of the fringe field driven liquid crystal display panel.

In some embodiments, the second main optical axis is at an acute angle or a right angle in clock-wise direction with respect to the first main optical axis in plan view of the fringe field driven liquid crystal display panel; and the second rubbing angle is at an acute angle in counter-clock-wise direction with respect to the first rubbing angle in plan view of the fringe field driven liquid crystal display panel. Optionally, the second main optical axis is at substantially 90 degrees in clock-wise direction with respect to the first main optical axis in plan view of the fringe field driven liquid crystal display panel; the first rubbing angle is at an acute angle of $$\frac{(SOC1*\Delta\sigma1*t1)}{\lambda}*180$$

in clock-wise direction with respect to the first polarization direction in plan view of the finge field driven liquid crystal display panel; and the second rubbing angle is at an acute angle of $$\frac{(SOC2*\Delta\sigma2*t2)}{\lambda}*180$$

in counter-clock-wise direction with respect to the first polarization direction in plan view of the fringe field driven liquid crystal display panel.

Figure 11:
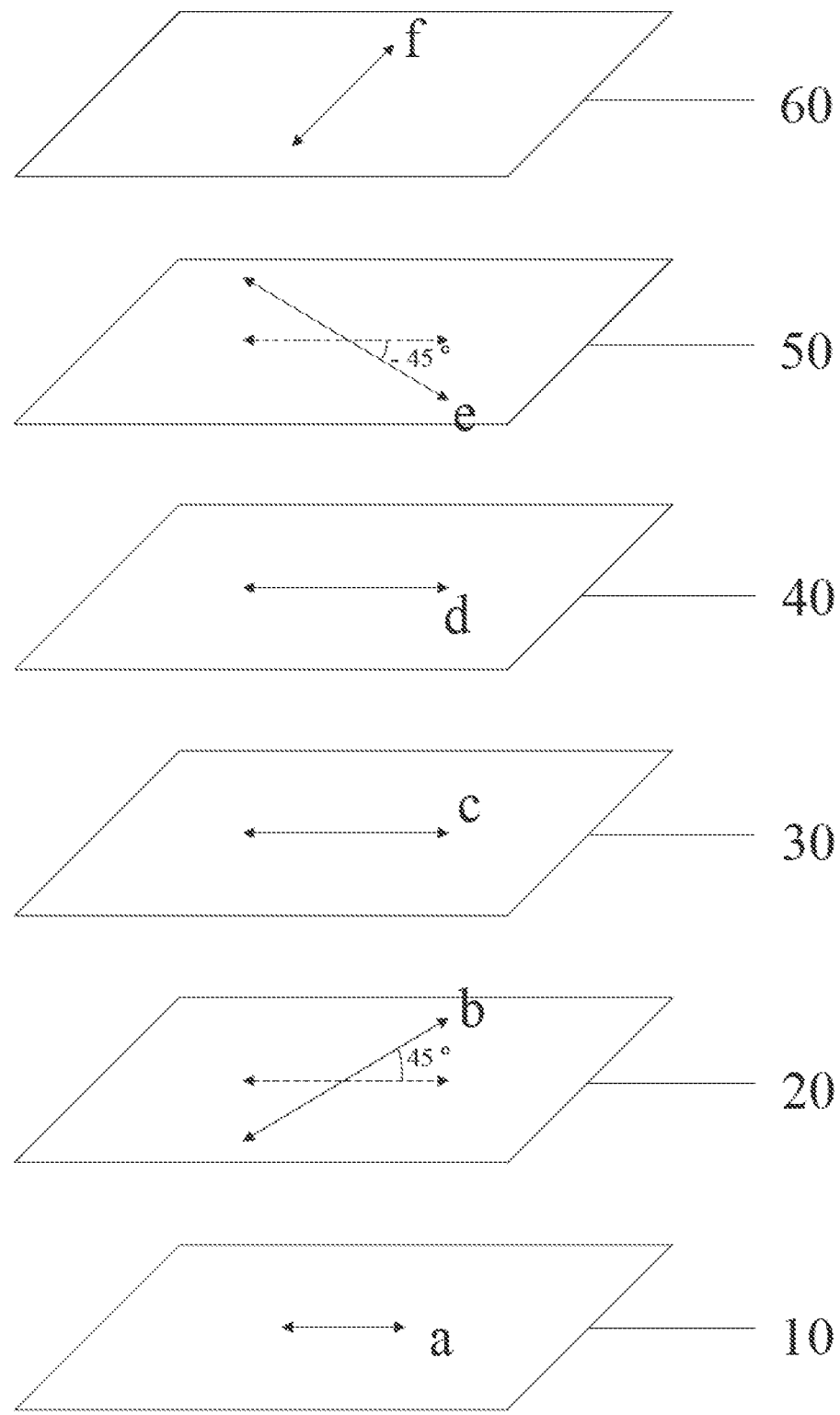
FIG. 11 illustrates the structure of a display panel in some embodiments according to the present disclosure.

FIG. 11 illustrates the structure of a display panel in some embodiments according to the present disclosure. Referring to FIG. 11, the display panel in some embodiments includes a second polarizer 10, a second glass layer 20 on the second polarizer 10, a second alignment film 30 on a side of the second glass layer 20 distal to the second polarizer 10, a first alignment film 40 on a side of the second alignment film 30 distal to the second glass layer 20, a first glass layer 50 on a side of the first alignment film 40 distal to the second alignment film 30, and a first polarizer 60 on a side of the first glass layer 50 distal to the first alignment film 40. As shown in FIG. 11, the second glass layer 20 has a second main optical axis along a direction b, and the first glass layer 50 has a first main optical axis along a direction e. The first main optical axis along the direction e is at 45 degrees in counter-clock-wise direction with respect to the second polarization direction along a direction a in plan view of the fringe field driven liquid crystal display panel. The second main optical axis along the direction b is at substantially 45 degrees in clock-wise direction with respect to the second polarization direction along the direction a in plan view of the fringe field driven liquid crystal display panel. In this example, the first main optical axis is substantially perpendicular to the second main optical axis. The second main optical axis along the direction b is at a right angle in clock-wise direction with respect to the first main optical axis along the direction e in plan view of the fringe field driven liquid crystal display panel. The first alignment film 40 has a first rubbing angle along a direction d, the second alignment film 30 has a second rubbing angle along a direction c, the direction c and the direction d are substantially parallel to each other. The second polarizer 10 has a second polarization direction along a direction a, the first polarizer 60 has a first polarization direction along a direction f, the direction a and the direction f are substantially perpendicular to each other. As explained in FIG. 9, a large light leakage occurs in this display panel.

Figure 12:
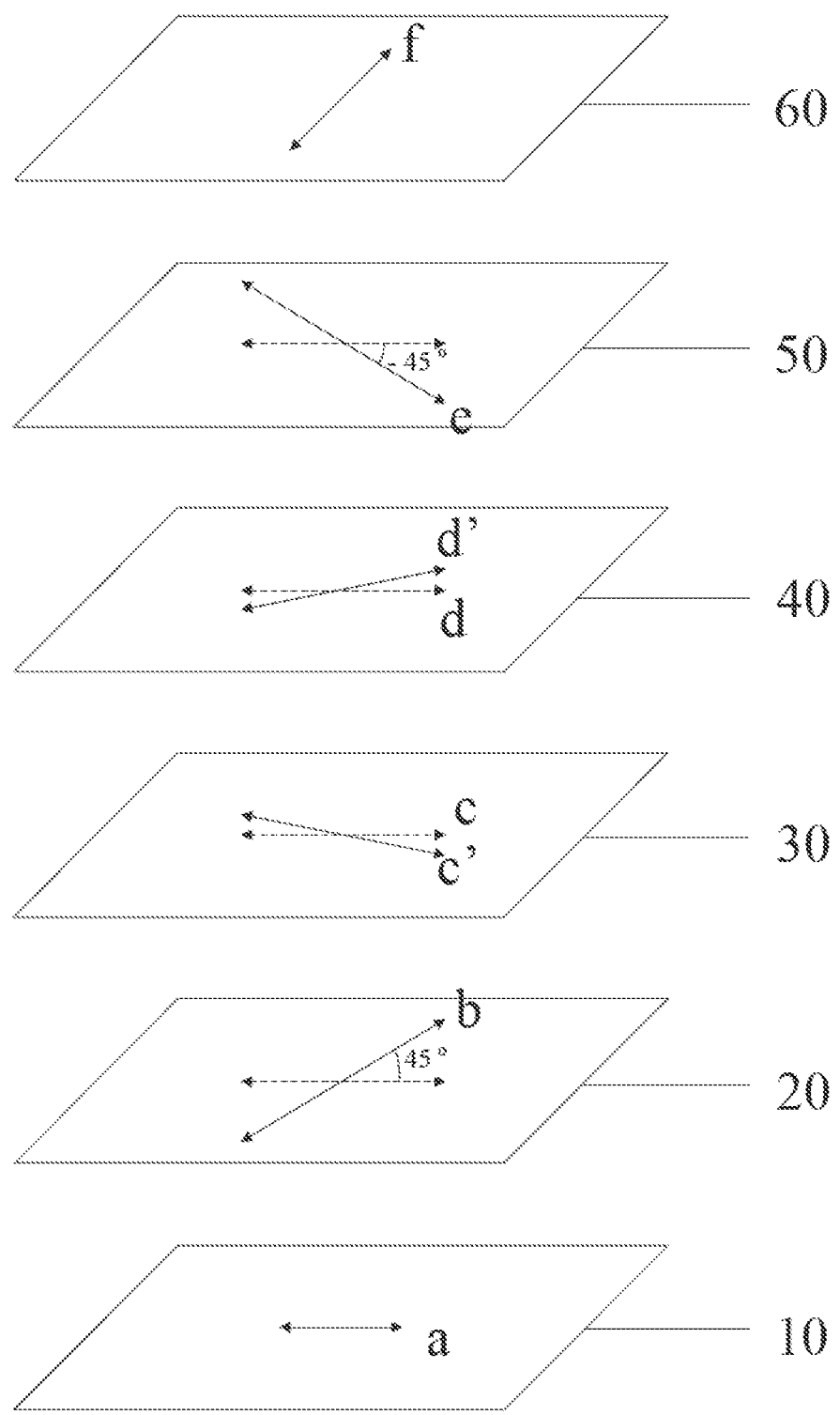
FIG. 12 illustrates the structure of a display panel in some embodiments according to the present disclosure.

FIG. 12 illustrates the structure of a display panel in some embodiments according to the present disclosure. Referring to FIG. 12, to reduce the light leakage in the display panel, the second rubbing angle is at an acute angle in clock-wise direction with respect to the second polarization direction along the direction a in plan view of the fringe field driven liquid crystal display panel, and the first rubbing angle is at an acute angle in counter-clock-wise direction with respect to the second polarization direction along the direction a in plan view of the fringe field driven liquid crystal display panel. For example, the second rubbing angle of the second alignment film 30 is now along a direction c', rotated clock-wisely from the second rubbing angle direction c in FIG. 11. The first rubbing angle of the first alignment film 40 is now along a direction d' rotated counter-clock-wisely from the first rubbing angle direction d in FIG. 11. As shown in FIG. 12, the second rubbing angle is at an acute angle in counter-clock-wise direction with respect to the first rubbing angle in plan view of the fringe field driven liquid crystal display panel. Optionally, the second rubbing angle is at an acute angle of $$\frac{(SOC1*\Delta\sigma1*t1)}{\lambda}*180$$

in clock-wise direction with respect to the second polarization direction in plan view of the fringe field driven liquid crystal display panel; and the first rubbing angle is at an acute angle of $$\frac{(SOC2*\Delta\sigma2*t2)}{\lambda}*180$$

in counter-clock-wise direction with respect to the second polarization direction in plan view of the fringe field driven liquid crystal display panel. Optionally, the second rubbing angle is at an acute angle of $$\frac{(SOC1*\Delta\sigma1*t1)+(SOC2*\Delta\sigma2*t2)}{\lambda}*180$$

in clock-wise direction with respect to the first rubbing angle in plan view of the fringe field driven liquid crystal display panel. As explained in FIG. 10, light leakage and color shift are much reduced in this display panel. SOC1 is the stress optical coefficient value of the first glass layer; SOC2 is the stress optical coefficient value of the second glass layer; Δσ1 is principal stress difference value of the first glass layer; Δσ2 is principal stress difference value of the second glass layer; t1 is a thickness of the first glass layer; t2 is a thickness of the second glass layer; and λ is a wavelength of incident light. Optionally, λ is 550 nm.

Figure 13:
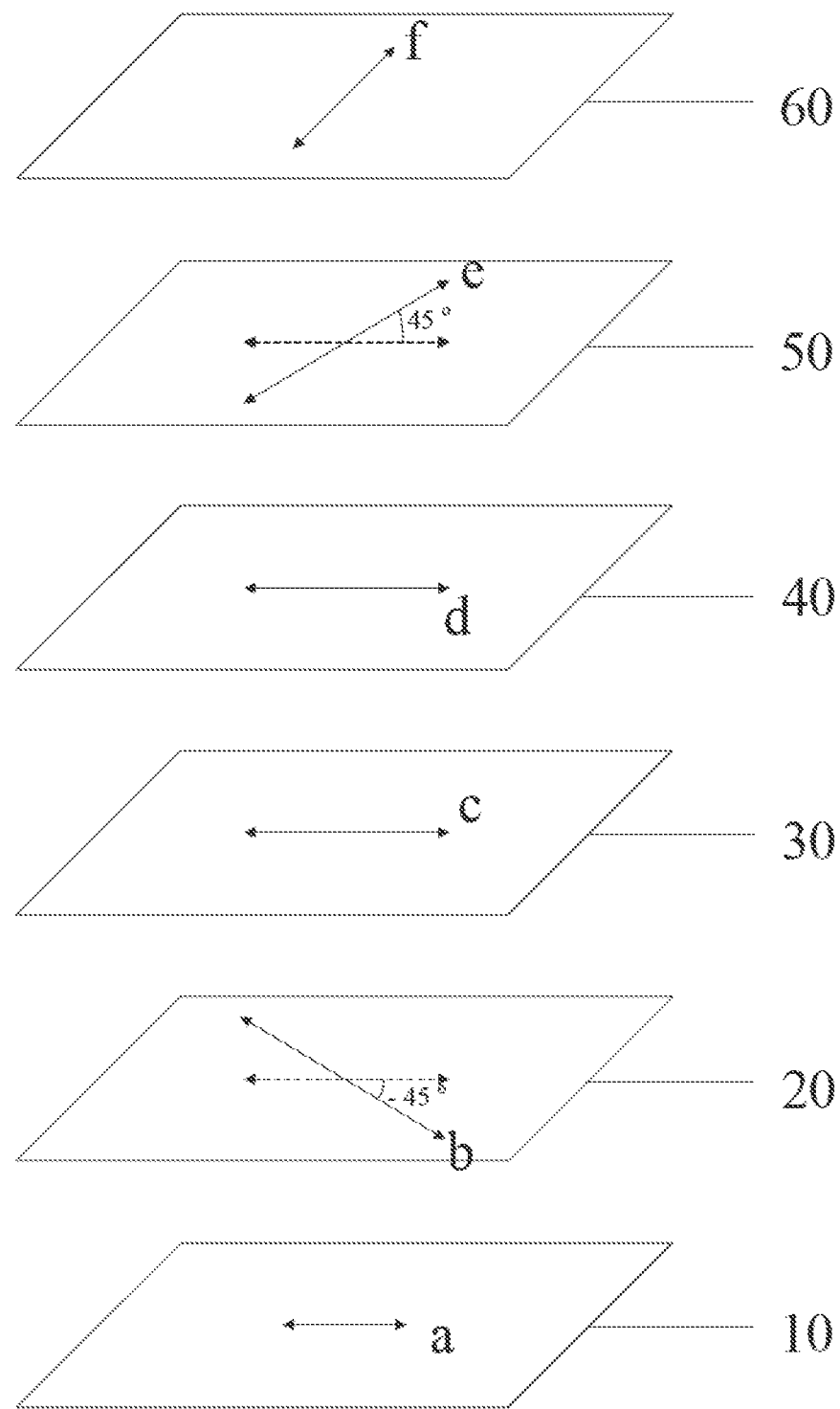
FIG. 13 illustrates the structure of a display panel in some embodiments according to the present disclosure.

FIG. 13 illustrates the structure of a display panel in some embodiments according to the present disclosure. Referring to FIG. 13, the second glass layer 20 has a second main optical axis along a direction b, and the first glass layer 50 has a first main optical axis along a direction e. The first main optical axis is at 45 degrees in clock-wise direction with respect to the first polarization direction in plan view of the fringe field driven liquid crystal display panel. The second main optical axis is at substantially 45 degrees in counter-clock-wise direction with respect to the first polarization direction in plan view of the fringe field driven liquid crystal display panel. The second main optical axis along the direction b is at a right angle in clock-wise direction with respect to the first main optical axis along the direction e in plan view of the fringe field driven liquid crystal display panel. The first alignment film 40 has a first rubbing angle along a direction d, the second alignment film 30 has a second rubbing angle along a direction c, the direction c and the direction d are substantially parallel to each other. As explained in FIG. 7, a large light leakage occurs in this display panel.

Figure 14:
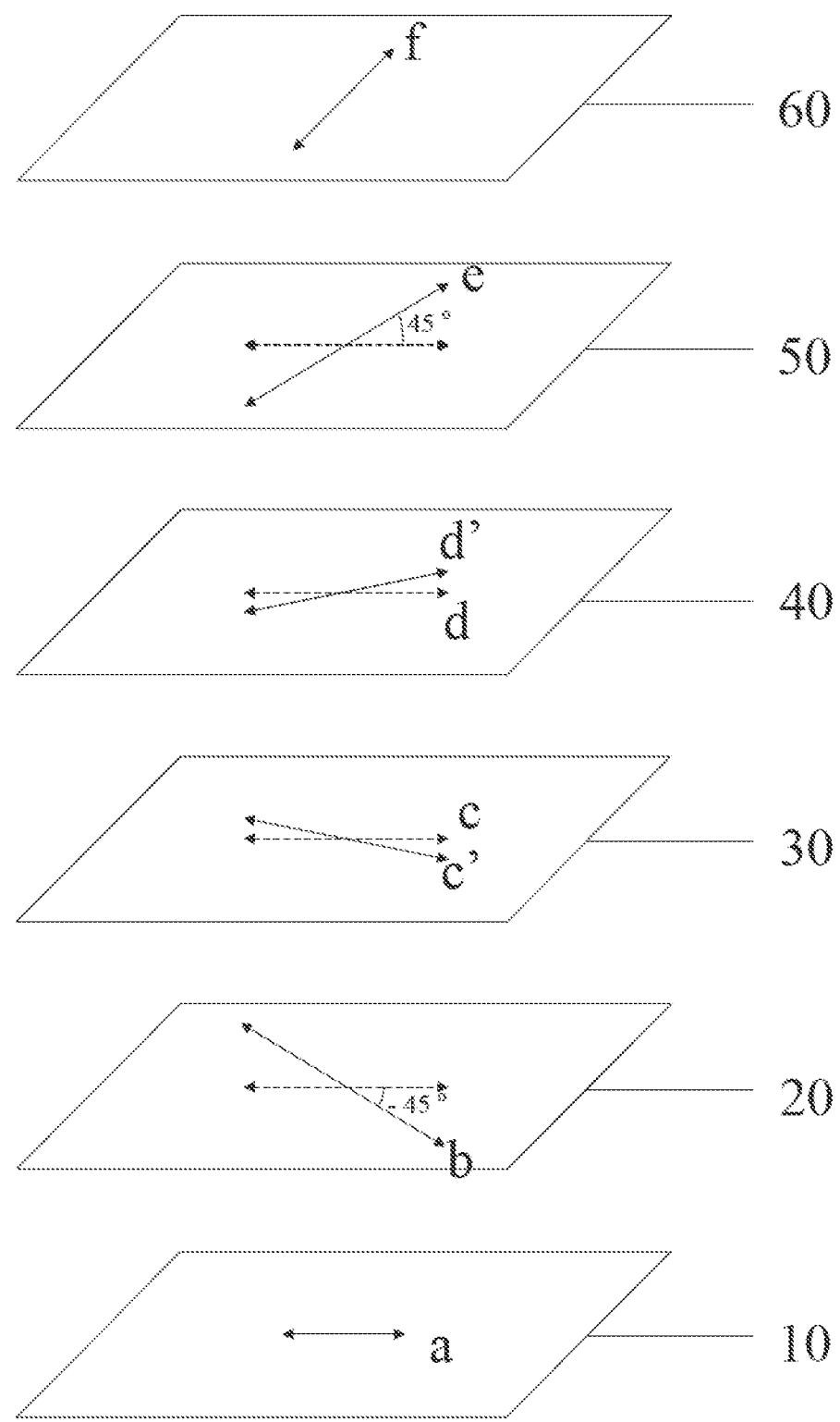
FIG. 14 illustrates the structure of a display panel in some embodiments according to the present disclosure.

FIG. 14 illustrates the structure of a display panel in some embodiments according to the present disclosure. Referring to FIG. 14, to reduce the light leakage in the display panel, the first rubbing angle is at an acute angle in counter-clock-wise direction with respect to the second polarization direction along the direction a in plan view of the fringe field driven liquid crystal display panel, and the second rubbing angle is at an acute angle in clock-wise direction with respect to the second polarization direction along the direction a in plan view of the fringe field driven liquid crystal display panel. For example, the second rubbing angle of the second alignment film 30 is now along a direction c' rotated clock-wisely from the second rubbing angle direction c in FIG. 13. The first rubbing angle of the first alignment film 40 is now along a direction d', rotated counter-clock-wisely from the first rubbing angle direction d in FIG. 13. As shown in FIG. 14, the second rubbing angle is at an acute angle in clock-wise direction with respect to the first rubbing angle in plan view of the fringe field driven liquid crystal display panel. Optionally, the first rubbing angle is at an acute angle of $$\frac{(SOC1*\Delta\sigma1*t1)}{\lambda}*180$$

in counter-clock-wise direction with respect to the second polarization direction in plan view of the fringe field driven liquid crystal display panel; and the second rubbing angle is at an acute angle of $$\frac{(SOC2*\Delta\sigma2*t2)}{\lambda}*180$$

clock-wise direction with respect to the second polarization direction in plan view of the fringe field driven liquid crystal display panel. Optionally, the second rubbing angle is at an acute angle of $$\frac{(SOC1*\Delta\sigma1*t1)+(SOC2*\Delta\sigma2*t2)}{\lambda}*180$$

in clock-wise direction with respect to the first rubbing angle in plan view of the fringe field driven liquid crystal display panel. As explained in FIG. 8, light leakage and color shift are much reduced in this display panel. SOC1 is the stress optical coefficient value of the first glass layer; SOC2 is the stress optical coefficient value of the second glass layer; Δσ1 is principal stress difference value of the first glass layer; Δσ2 is principal stress difference value of the second glass layer; t1 is a thickness of the first glass layer; t2 is a thickness of the second glass layer; and λ is a wavelength of incident light. Optionally, λ is 550 nm.

In another aspect, the present disclosure provides a fringe field driven liquid crystal display panel having a first substrate comprising a first glass layer; a second substrate facing the first substrate and comprising a second glass layer, a liquid crystal layer between the first substrate and the second substrate; a first polarizer on a side of the first substrate distal to the second substrate, the first polarizer having a first polarization direction; a second polarizer on a side of the second substrate distal to the first substrate, the second polarizer having a second polarization direction; and at least one compensation plate. Optionally, a first main optical axis of the first glass layer and a second main optical axis of the second glass layer are non-parallel to each other and have an included angle α. Optionally, the at least one compensation plate is configured to reduce light leakage and color shift in the fringe field driven liquid crystal display panel.

Various appropriate implementations may be practiced to add the at least one compensation plate. For example, the fringe field driven liquid crystal display panel may include a first compensation plate on a side of the first substrate distal to the second substrate. The first compensation plate has a first retardation along a direction substantially orthogonal to the first main optical axis of the first glass layer; and the first retardation has an absolute value substantially the same as a retardation value of the first glass layer. Optionally, the fringe field driven liquid crystal display panel includes a second compensation plate on a side of the second substrate distal to the first substrate. The second compensation plate has a second retardation along a direction substantially orthogonal to the second main optical axis of the second glass layer; and the second retardation has an absolute value substantially the same as a retardation value of the second glass layer. Optionally, the fringe field driven liquid crystal display panel includes a first compensation plate on a side of the first substrate distal to the second substrate and a second compensation plate on a side of the second substrate distal to the first substrate. The first compensation plate has a first retardation along a direction substantially orthogonal to the first main optical axis of the first glass layer; the first retardation has an absolute value substantially the same as a retardation value of the first glass layer; the second compensation plate has a second retardation along a direction substantially orthogonal to the second main optical axis of the second glass layer; and the second retardation has an absolute value substantially the same as a retardation value of the second glass layer. Optionally, the compensation plate is an A-plate. Optionally, the fringe field driven liquid crystal display panel is an Advanced Super Dimension Switch mode liquid crystal display panel.

In some embodiments, the at least one compensation plate is integral with at least one of the first polarizer and the second polarizer. Optionally, the first compensation plate is integral with the first polarizer. The first polarizer has a first retardation along a direction substantially orthogonal to the first main optical axis of the first glass layer; and the first retardation has an absolute value substantially the same as a retardation value of the first glass layer. Optionally, the second compensation plate is integral with the second polarizer. The second polarizer has a second retardation along a direction substantially orthogonal to the second main optical axis of the second glass layer; and the second retardation has an absolute value substantially the same as a retardation value of the second glass layer. Optionally, the first compensation plate is integral with the first polarizer, and the second compensation plate is integral with the second polarizer. The first polarizer has a first retardation along a direction substantially orthogonal to the first main optical axis of the first glass layer; the first retardation has an absolute value substantially the same as a retardation value of the first glass layer; the second polarizer has a second retardation along a direction substantially orthogonal to the second main optical axis of the second glass layer; and the second retardation has an absolute value substantially the same as a retardation value of the second glass layer.

Figure 15:
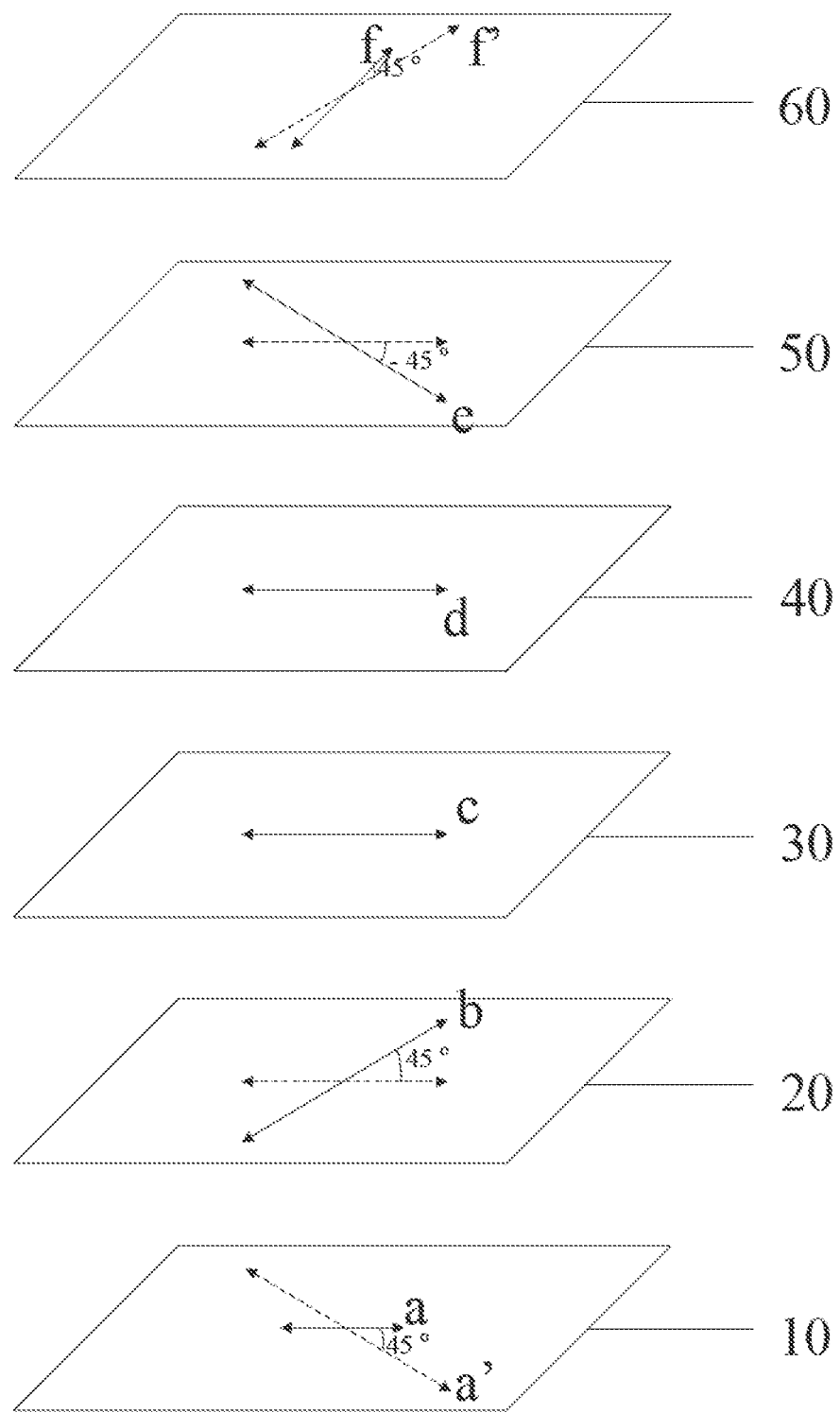
FIG. 15 illustrates the structure of a display panel in some embodiments according to the present disclosure.

FIG. 15 illustrates the structure of a display panel in some embodiments according to the present disclosure. Referring to FIG. 15, to reduce the light leakage in the display panel, a first polarizer 60 and a second polarizer 10 are included in the fringe field driven liquid crystal display panel. The first polarizer 60 is a polarizer in which the first compensation plate is integral with the first polarizer 60, and the second polarizer 10 is a polarizer in which the second compensation plate is integral with the second polarizer 10. The first polarizer 60 has a first retardation along a direction f' substantially orthogonal to the first main optical axis of the first glass layer 50 along the direction e. The first retardation has an absolute value substantially the same as a retardation value of the first glass layer 50. The second polarizer 10 has a second retardation along a direction a' substantially orthogonal to the second main optical axis of the second glass layer 20 along the direction b. The second retardation has an absolute value substantially the same as a retardation value of the second glass layer. Light leakage and color shift are much reduced in this display panel. Optionally, the compensation plate is an A-plate. Optionally, the fringe field driven liquid crystal display panel is an Advanced Super Dimension Switch mode liquid crystal display panel.

Figure 16:
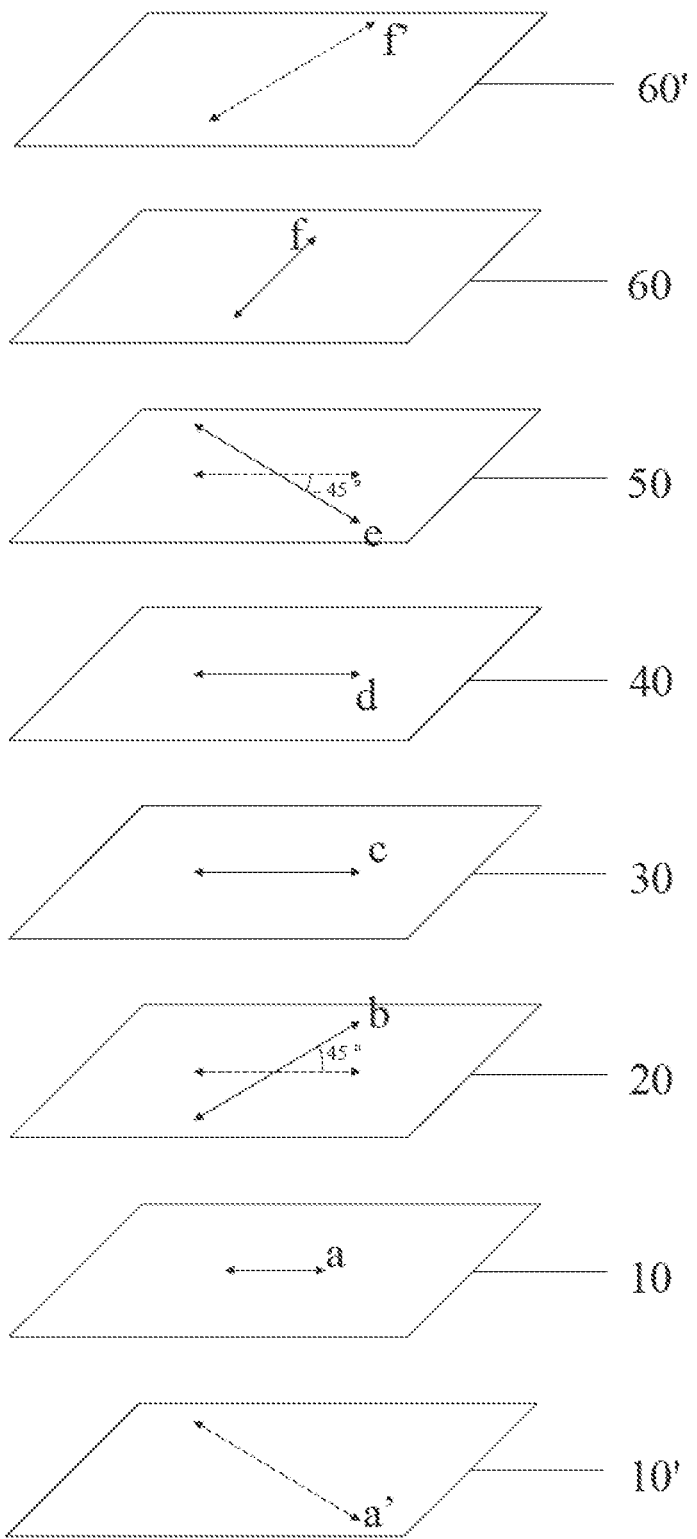
FIG. 16 illustrates the structure of a display panel in some embodiments according to the present disclosure.

FIG. 16 illustrates the structure of a display panel in some embodiments according to the present disclosure. Referring to FIG. 16, to reduce the light leakage in the display panel, the fringe field driven liquid crystal display panel further includes a first compensation plate 60' on a side of the first polarizer 60 distal to the first glass layer 50, and a second compensation plate 10' on a side of the second polarizer 10 distal to the second glass layer 20. As shown in FIG. 16, the first compensation plate 60' has a first retardation along a direction f' substantially orthogonal to the first main optical axis of the first glass layer along the direction e. The first retardation has an absolute value substantially the same as a retardation value of the first glass layer 50. The second compensation plate 10' has a second retardation along a direction a' substantially orthogonal to the second main optical axis of the second glass layer along the direction b. The second retardation has an absolute value substantially the same as a retardation value of the second glass layer 20. Light leakage and color shift are much reduced in this display panel. Optionally, the compensation plate is an A-plate. Optionally, the fringe field driven liquid crystal display panel is an Advanced Super Dimension Switch mode liquid crystal display panel.

In another aspect, the present disclosure provides a fringe field driven liquid crystal display panel having a first substrate comprising a first glass layer; a second substrate facing the first substrate and comprising a second glass layer; a liquid crystal layer between the first substrate and the second substrate; and a sealant layer between the first substrate and the second substrate sealing the first substrate and the second substrate together to form a cell. Optionally, a first main optical axis of the first glass layer and a second main optical axis of the second glass layer are non-parallel to each other and have an included angle α, α≤90 degrees. Optionally, the sealant layer has a width at a first corner and a second corner greater than that at a third corner and a fourth corner, configured to reduce light leakage and color shift in the fringe field driven liquid crystal display panel. The first corner and the second corner are diagonally opposite to each other, the third corner and the fourth corner are diagonally opposite to each other, and an included angle between a direction from the first corner to the second corner and the first main optical axis is greater than an included angle between the direction from the first corner to the second corner and the second main optical axis. By having this design, the retardation in the first glass layer and the second glass layer can be reduced or eliminated, thereby reducing light leakage and color shift in the fringe field driven liquid crystal display panel. Optionally, the fringe field driven liquid crystal display panel is an Advanced Super Dimension Switch mode liquid crystal display panel.

In another aspect, the present disclosure further provides a fringe field driven liquid crystal display apparatus having a fringe field driven liquid crystal display panel described herein. Examples of appropriate fringe field driven liquid crystal display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fringe field driven liquid crystal display panel, comprising:
    a first substrate comprising a first glass layer and a first alignment film on the first glass layer;
    a second substrate facing the first substrate and comprising a second glass layer and a second alignment film on the second glass layer; and
    a liquid crystal layer between the first alignment film and the second alignment film;
    wherein a first main optical axis of the first glass layer and a second main optical axis of the second glass layer are non-parallel to each other and have an included angle α; and
    the first alignment film and the second alignment film have non-parallel rubbing angles, configured to reduce light leakage and color shift in the fringe field driven liquid crystal display panel;
    wherein a difference Δθ between a first rubbing angle of the first alignment film and a second rubbing angle of the second alignment film is substantially equal to $$\left(\sin\frac{\alpha}{2}\right)^2 * \left(\frac{ret}{\lambda}\right) * 360;$$

wherein ret is an optical retardation value of the first glass layer and the second glass layer;
    ret is substantially equal to (SOC1*Δσ1*t1)+(SOC2*Δσ2*t2);
    SOC1 is the stress optical coefficient value of the first glass layer; SOC2 is the stress optical coefficient value of the second glass layer; Δσ1 is principal stress difference value of the first glass layer; Δσ2 is principal stress difference value of the second glass layer; t1 is a thickness of the first glass layer; t2 is a thickness of the second glass layer; and λ is a wavelength of incident light.

2. The fringe field driven liquid crystal display panel of claim 1, wherein α is substantially 90 degrees; and
Δθ is substantially equal to $$\frac{(SOC1*\Delta\sigma1*t1)+(SOC2*\Delta\sigma2*t2)}{\lambda}*180.$$

3. The fringe field driven liquid crystal display panel of claim 1, further comprising:
    a first polarizer on a side of the first substrate distal to the second substrate, the first polarizer having a first polarization direction; and
    a second polarizer on a side of the second substrate distal to the first substrate, the second polarizer having a second polarization direction;
    wherein the first main optical axis is at an acute angle in clock-wise direction with respect to the first polarization direction;
    the second main optical axis is at an acute angle in counter-clock-wise direction with respect to the first polarization direction;
    the first rubbing angle is at an acute angle in counter-clock-wise direction with respect to the first polarization direction; and
    the second rubbing angle is at an acute angle in clock-wise direction with respect to the first polarization direction.

4. The fringe field driven liquid crystal display panel of claim 3, wherein the first main optical axis is at 45 degrees in clock-wise direction with respect to the first polarization direction;
    the second main optical axis is at substantially 45 degrees in counter-clock-wise direction with respect to the first polarization direction;
    the first rubbing angle is at an acute angle of $$\frac{(SOC1 * \Delta\sigma 1 * t1)}{\lambda} * 180$$

in counter-clock-wise direction with respect to the first polarization direction; and the second rubbing angle is at an acute angle of $$\frac{(SOC2 * \Delta\sigma 2 * t2)}{\lambda} * 180$$

in clock-wise direction with respect to the first polarization direction.

5. The fringe field driven liquid crystal display panel of claim 1, further comprising:
   a first polarizer on a side of the first substrate distal to the second substrate, the first polarizer having a first polarization direction; and
   a second polarizer on a side of the second substrate distal to the first substrate, the second polarizer having a second polarization direction;
   wherein the first main optical axis is at an acute angle in counter-clock-wise direction with respect to the first polarization direction;
   the second main optical axis is at an acute angle in clock-wise direction with respect to the first polarization direction;
   the first rubbing angle is at an acute angle in clock-wise direction with respect to the first polarization direction; and
   the second rubbing angle is at an acute angle in counter-clock-wise direction with respect to the first polarization direction.

6. The fringe field driven liquid crystal display panel of claim 5, wherein the first main optical axis is at 45 degrees in counter-clock-wise direction with respect to the first polarization direction;
   the second main optical axis is at substantially 45 degrees in clock-wise direction with respect to the first polarization direction;
   the first rubbing angle is at an acute angle of $$\frac{(SOC1 * \Delta\sigma 1 * t1)}{\lambda} * 180$$

in clock-wise direction with respect to the first polarization direction; and the second rubbing angle is at an acute angle of $$\frac{(SOC2 * \Delta\sigma 2 * t2)}{\lambda} * 180$$

in counter-clock-wise direction with respect to the first polarization direction.

7. The fringe field driven liquid crystal display panel of claim 1, wherein
   the second main optical axis is at an acute angle or a right angle in counter-clock-wise direction with respect to the first main optical axis; and
   the second rubbing angle is at an acute angle in clock-wise direction with respect to the first rubbing angle.

8. The fringe field driven liquid crystal display panel of claim 1, wherein
   the second main optical axis is at an acute angle or a right angle in clock-wise direction with respect to the first main optical axis; and
   the second rubbing angle is at an acute angle in counter-clock-wise direction with respect to the first rubbing angle.

9. The fringe field driven liquid crystal display panel of claim 1, wherein the fringe field driven liquid crystal display panel is an Advanced Super Dimension Switch mode liquid crystal display panel.

10. The fringe field driven liquid crystal display panel of claim 1, further comprising:
    a first polarizer on a side of the first substrate distal to the second substrate, the first polarizer having a first polarization direction;
    a second polarizer on a side of the second substrate distal to the first substrate, the second polarizer having a second polarization direction; and
    at least one compensation plate configured to reduce light leakage and color shift in the fringe field driven liquid crystal display panel.

11. A fringe field driven liquid crystal display panel, comprising:
    a first substrate comprising a first glass layer;
    a second substrate facing the first substrate and comprising a second glass layer;
    a liquid crystal layer between the first substrate and the second substrate;
    a first polarizer on a side of the first substrate distal to the second substrate, the first polarizer having a first polarization direction;
    a second polarizer on a side of the second substrate distal to the first substrate, the second polarizer having a second polarization direction; and
    at least one compensation plate;
    wherein a first main optical axis of the first glass layer and a second main optical axis of the second glass layer are non-parallel to each other and have an included angle $\alpha$; and
    the at least one compensation plate is configured to reduce light leakage and color shift in the fringe field driven liquid crystal display panel;
    wherein the fringe field driven liquid crystal display panel comprises a first compensation plate on a side of the first substrate distal to the second substrate;
    the first compensation plate has a first retardation along a direction substantially orthogonal to the first main optical axis of the first glass layer; and
    the first retardation has an absolute value substantially the same as a retardation value of the first glass layer.

12. The fringe field driven liquid crystal display panel of claim 11, wherein the fringe field driven liquid crystal display panel further comprises a second compensation plate on a side of the second substrate distal to the first substrate;
    the second compensation plate has a second retardation along a direction substantially orthogonal to the second main optical axis of the second glass layer; and
    the second retardation has an absolute value substantially the same as a retardation value of the second glass layer.

13. The fringe field driven liquid crystal display panel of claim 11, wherein the at least one compensation plate is integral with at least one of the first polarizer and the second polarizer.

14. A fringe field driven liquid crystal display panel, comprising:
- a first substrate comprising a first glass layer;
- a second substrate facing the first substrate and comprising a second glass layer;
- a liquid crystal layer between the first substrate and the second substrate;
- a first polarizer on a side of the first substrate distal to the second substrate, the first polarizer having a first polarization direction;
- a second polarizer on a side of the second substrate distal to the first substrate, the second polarizer having a second polarization direction; and
- at least one compensation plate;
- wherein a first main optical axis of the first glass layer and a second main optical axis of the second glass layer are non-parallel to each other and have an included angle α; and
- the at least one compensation plate is configured to reduce light leakage and color shift in the fringe field driven liquid crystal display panel;
- wherein the at least one compensation plate is integral with at least one of the first polarizer and the second polarizer;
- wherein a first compensation plate is integral with the first polarizer;
- the first polarizer has a first retardation along a direction substantially orthogonal to the first main optical axis of the first glass layer; and
- the first retardation has an absolute value substantially the same as a retardation value of the first glass layer.

15. The fringe field driven liquid crystal display panel of claim 13, wherein a second compensation plate is integral with the second polarizer;
- the second polarizer has a second retardation along a direction substantially orthogonal to the second main optical axis of the second glass layer; and
- the second retardation has an absolute value substantially the same as a retardation value of the second glass layer.

\* \* \* \* \*